(12) United States Patent
Takae et al.

(10) Patent No.: US 8,577,545 B2
(45) Date of Patent: Nov. 5, 2013

(54) VEHICLE DRIVING ASSIST APPARATUS AND METHOD

(75) Inventors: Yasuhiko Takae, Isehara (JP); Yasuhiro Matsushita, Yokosuka (JP); Hirofumi Hashiguchi, Yokosuka (JP); Kazuto Sato, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 373 days.

(21) Appl. No.: 13/002,624

(22) PCT Filed: Jul. 3, 2009

(86) PCT No.: PCT/JP2009/003089
§ 371 (c)(1),
(2), (4) Date: Jan. 4, 2011

(87) PCT Pub. No.: WO2010/004712
PCT Pub. Date: Jan. 14, 2010

(65) Prior Publication Data
US 2011/0118929 A1    May 19, 2011

(30) Foreign Application Priority Data

Jul. 8, 2008    (JP) .................................. 2008-177532

(51) Int. Cl.
*G08G 1/16*    (2006.01)

(52) U.S. Cl.
USPC .......................................... 701/33.4; 701/45

(58) Field of Classification Search
None
See application file for complete search history.

(56) References Cited

U.S. PATENT DOCUMENTS

| | | | | |
|---|---|---|---|---|
| 4,058,796 A | * | 11/1977 | Oishi et al. ..................... | 340/459 |
| 5,642,093 A | * | 6/1997 | Kinoshita et al. ............. | 340/439 |
| 7,253,724 B2 | * | 8/2007 | Prakah-Asante et al. ..... | 340/439 |
| 7,440,830 B2 | | 10/2008 | Isaji et al. | |
| 2005/0080565 A1 | * | 4/2005 | Olney et al. .................... | 701/301 |
| 2005/0085954 A1 | * | 4/2005 | Isaji et al. ......................... | 701/1 |
| 2005/0203685 A1 | * | 9/2005 | Kopf et al. ....................... | 701/36 |
| 2007/0106475 A1 | * | 5/2007 | Kondoh ......................... | 701/301 |
| 2008/0024284 A1 | * | 1/2008 | Baratoff et al. ................ | 340/435 |
| 2010/0295707 A1 | * | 11/2010 | Bennie et al. .................. | 340/988 |

FOREIGN PATENT DOCUMENTS

| | | |
|---|---|---|
| JP | 7-141600 A | 6/1995 |
| JP | 2004-231017 A | 8/2004 |
| JP | 2005-122390 A | 5/2005 |
| JP | 2005-209073 A | 8/2005 |
| JP | 2006-195638 A | 7/2006 |
| JP | 2007-86880 A | 4/2007 |
| JP | 2007-233744 A | 9/2007 |
| JP | 2008-117140 A | 5/2008 |
| JP | 2008-140332 A | 6/2008 |
| JP | 2010-9300 A | 1/2010 |

* cited by examiner

*Primary Examiner* — Michael J Zanelli
(74) *Attorney, Agent, or Firm* — Foley & Lardner LLP

(57) ABSTRACT

A vehicle driving assist apparatus includes an input section to sense a vehicle traveling condition of a vehicle, an output section to present assist information to a driver of the vehicle, and a control section to prepare the assist information in accordance with the vehicle traveling condition sensed by the sensing section. The control section is configured to determine an estimation quantity (such as a driver's receptivity or a driver's responsiveness to the assist information, or a driver's driving behavior), and to adjust the assist information in accordance with the estimation quantity. The control section may be further configured to determine a presentation mode in accordance with the estimation quantity, and to present the assist information through the output section to the driver in the presentation mode.

20 Claims, 13 Drawing Sheets

RECEPTIVE LEVEL 1

RECEPTIVE LEVEL 2

RECEPTIVE LEVEL 3

RECEPTIVE LEVEL 4

RECEPTIVE LEVEL 5

RECEPTIVE LEVEL 1

RECEPTIVE LEVEL 2

RECEPTIVE LEVEL 3

RECEPTIVE LEVEL 4

RECEPTIVE LEVEL 5

RECEPTIVE LEVEL 1

RECEPTIVE LEVEL 2

RECEPTIVE LEVEL 3

RECEPTIVE LEVEL 4

RECEPTIVE LEVEL 5

VEHICLE DRIVING ASSIST APPARATUS AND METHOD

TECHNICAL FIELD

The present invention relates to apparatus and/or method for assisting or supporting a driver of a vehicle, and more specifically to apparatus and/or method for presenting assist information to the driver to promote stability.

BACKGROUND ART

A collision alarm system disclosed in a patent document 1 (JP2004-231017 A) estimates the degree of concentration of the driver, and suppresses a collision alarm when the degree of concentration is high. A driving support system disclosed in a patent document 2 (JP2005-209073 A) adjusts the timing of presentation of information about the position of a stop sign and a forward obstacle, in accordance with various factors of the driver (such as age, sight and driving experience) capable of affecting the alertness, and response speed of the driver.

SUMMARY OF INVENTION

However, the collision alarm system of patent document 1 is merely arranged to provide information only when the possibility of collision becomes higher. This collision alarm system is unable to provide assist information adequately in accordance with surrounding condition and driving condition. The driving support system of patent document 2 is arranged to support the driver in accordance with a characteristic of each driver. However, this system is unable to assist the driver in consideration of a varying condition of the driver. Therefore, it is an object of the present invention to provide apparatus and/or method for providing assist information in accordance with changes in condition of a driver.

According to one aspect of the present invention, a vehicle driving assist apparatus comprises: an input section configured to sense a vehicle traveling condition of a vehicle (which can be referred to as a controlled vehicle or controlled vehicle); an output section configured to present assist information to a driver of the controlled vehicle; and a control section configured to prepare the assist information in accordance with the vehicle traveling condition sensed by the sensing section. The control section is further configured to determines an estimation quantity representing a receptivity of the driver to receive the assist information presented to the driver, and to adjust the assist information presented to the driver, in accordance with the estimation quantity of the driver.

According to another aspect of the present invention, a vehicle driving assist apparatus comprises an input section to sense a vehicle traveling condition; an output section to present assist information to a driver; and a control section to determine a driving behavior of the driver in accordance with the vehicle traveling condition, and to adjust the assist information in accordance with the driving behavior.

According to still another aspect of the present invention, a vehicle driving assist method comprises a sensing operation of ascertaining the vehicle traveling condition; an output operation of presenting assist information to the driver; and a control operation of determining an estimation quantity representing a receptivity of the driver to receive the assist information presented to the driver, and setting the assist information in accordance with the estimating quantity of the driver.

The other objects and features of this invention will become understood from the following description with reference to the accompanying drawings.

DESCRIPTION OF EMBODIMENTS

Figure 1:
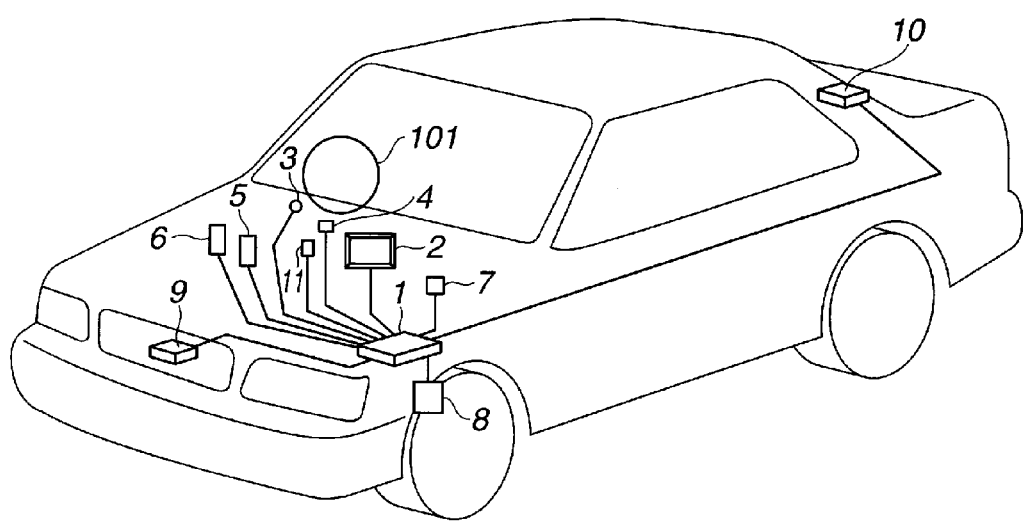
FIG. 1 is a schematic view showing a vehicle equipped with a driving assist system according to a first embodiment (and a second embodiment) of the present invention.

FIG. 1 schematically shows a vehicle (which can be referred to as a controlled vehicle or a central vehicle for convenience) equipped with a vehicle driving assist system according to a first embodiment of the present invention. The driving assist system includes a control unit 1 configured to perform variation calculating operations (or computer operations) for assistance to the driver. The driving assist system of FIG. 1 further includes an output device 2 in the form of a monitor device for serving as an output device for car navigation and as an audio-visual output device for producing audible and/or visual outputs, and a vehicle position sensor 3. In this example, monitor device 2 is an output device of a navigation system or module including a storage device or a storage medium storing road shape data 271 (including data on road curvature radius R), stop line position data 272 (including data on positions (longitudes and latitudes) of stop lines or stop signs), road speed limit data 273 (including data on legal speed limits of roads) and other information. The navigation module is capable of exchanging data with control unit 1. Monitor device 2 includes a visual output device 261 for producing a visual message and an audible output device 262 for producing an audible message. Vehicle position sensor 3 can detect the position (longitude and latitude) of the center vehicle shown in FIG. 1 (by GPS).

The driving assist system of FIG. 1 further includes a steering angle sensor 4 for sensing a steering angle which, in this example, is a steering wheel angle of a steering wheel 101, a brake sensor 5, such as a brake pedal sensor, arranged to sense a driver's brake input such as a depression quantity of a driver's brake pedal, an accelerator sensor 6, such as an accelerator pedal sensor, arranged to sense a driver's accelerator input such as the depression quantity of a driver's accelerator pedal. The driving assist system of FIG. 1 further includes an acceleration sensor 7 for sensing the acceleration (longitudinal acceleration) of the controlled vehicle, and a vehicle speed sensor 8 for sensing the vehicle speed of the controlled vehicle (by calculation from wheel speeds, for example). The driving assist system further includes a forward sensor 9 arranged to sense a forward inter-vehicle distance (or forward vehicle space interval) and a forward vehicle relative speed, to a forward (preceding) vehicle running ahead of the controlled vehicle, and a rearward sensor 10 arranged to sense a rearward inter-vehicle distance (rearward vehicle space interval) and a rearward vehicle relative speed, to a rearward (following) vehicle running after the controlled vehicle. Forward sensor 9 is mounted in a front part of the vehicle, and rearward sensor 10 is mounted in a rear part of the vehicle. The driving assist system of FIG. 1 further includes a tactile output device 11 for providing information or message in the form of a felt sensation on some part of the body of the driver (for example, by vibrating the steering wheel and/or a driver's seat, and/or pulling a driver's seat belt). In this example, tactile output device 11 includes a vibratory device or vibrator (or haptic device) arranged to vibrate steering wheel 101 (through the steering shaft).

Figure 2:
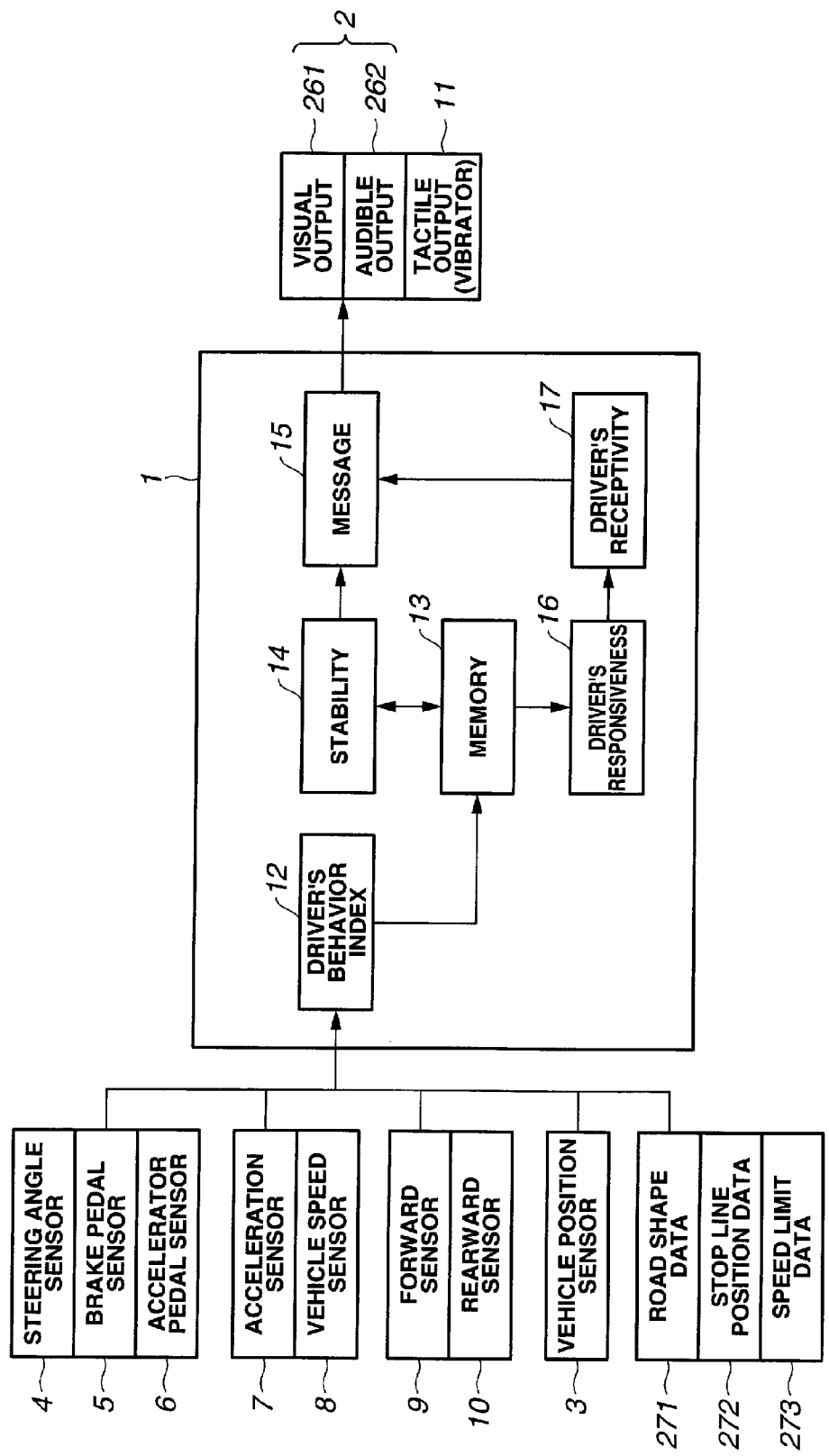
FIG. 2 is a block diagram showing the driving assist system shown in FIG. 1.

FIG. 2 shows the driving assist system according to the first embodiment in the form of a block diagram. This system includes an input section for collecting input information such as information to determine driver's driving behavior, a control section or controller including, as a main component, the control unit 1, and an output section for providing visual, audible and/or tactile information or messages to the driver.

The input section of this example includes a sensing section including various sensors 3-10, and the storage section (271, 272, 273) of the navigation module. The output section includes at least one of visual output device 261 for presenting visual information, audible output device 262 for presenting audible information and tactile output device 11 for presenting tactile information. In the illustrated example, the output section includes the audio-visual output device 2 in the form of monitor device including a display device serving as visual output device 261 and an audio device (such as a buzzer or a loudspeaker) serving as audible output device 262.

Control unit 1 shown in FIG. 2 includes a (driver's driving) behavior index calculating section 12, a stability calculating section 14, a message producing section 15, a (driver's) responsiveness calculating section 16 and a (driver's) receptivity calculating section 17.

Behavior index calculating section 12 calculates or measures a physical index parameter which includes at least one driver's driving behavior index indicative of a driver's driving behavior or driving tendency. Behavior index calculating section 12 of this example determines values of the behavior index periodically in a predetermined driving scene, by using the output signals of sensors 3-10 and data 271-273, and collects the values of the behavior index in a memory or storage section 13 in control unit 1.

Memory section 13 of this example stores the following four data sets. A first data set is a collection of values of the index parameter collected during a past (or most recent) predetermined longer period (three weeks, for example). The first data set is used for determining a long term tendency of the driver, as a reference or usual (or habitual) tendency or behavior of the driver for evaluating the stability. A second data set is a collection of values of the index parameter collected during a predetermined measuring period (30 min, for example) before or just before the time of most recent presentation of a (stability promoting) message to the driver. The second data set is used for determining a reference tendency or reference behavior, or before tendency or before behavior, in order to determine a responsiveness of the driver. A third data set is a collection of values of the index parameter collected during a most recent shorter period (30 min, for example). The third data set is used for determine a short term tendency of the driver (S42), as a current behavior to be compared with the long term tendency for evaluating the stability. A fourth data set is a collection of values of the index parameter collected during the measuring period after the time of the most recent presentation of the (stability promoting) message. The fourth data set is used for determining an after tendency or behavior (or responsive tendency or behavior) after the presentation of the message to the driver. To reduce the required memory capacity, it is possible to save these data sets in the form of common data items, with labels attached to the data items for the four types of the data sets.

Stability calculating section 14 calculates a stability condition such as a stability and a variation of the stability, from values of the index parameter collected in memory section 13. In this example, stability calculating section 14 calculates a stability indicator by using the first data set for determining the long term tendency, and the third data set for determining the most recent short term tendency, as mentioned later. The stability indicator is a quantity representing a degree of stability of the current driving behavior of the driver, or a deviation of the current driving behavior from the reference behavior. The stability (or the stability indicator) become higher when the condition becomes safer.

Message producing section 15 of this example produces a driver assisting message (piece of information) in accordance with the driver's driving behavior, and the stability, and presents the message to the driver through one or more of the visual, audible and tactile output devices 261, 262 and 11.

Responsiveness calculating section 16 calculates a (driver's) responsiveness by checking a past response of the driver to past presentation of a driver assisting message. In this example, responsiveness calculating section 16 calculates the responsiveness by using the second data set for determining the reference tendency or behavior (such as the before tendency or before behavior), and the fourth data set for determining the after or responsive tendency or behavior of the driver. The responsiveness is a quantity for assessing how the driver has responded to a driver assisting message (such as a stability promoting message).

Receptivity calculating section 17 calculates a (driver's) receptivity from the vehicle traveling condition sensed by the sensing section. In this embodiment, the receptivity is calculated from the driving behavior, or from the responsiveness of the driver. The receptivity is an evaluation index (or performance index) representing the readiness of the driver to accept a driver assisting message. In this example, the receptivity is a receptive level which is a discrete quantity assuming one of a plurality of different levels. In this example, a most recent level and a default level are stored in this section 17 or in memory section 13. The most recent level is the receptive level most recently determined or updated. The default level is a predetermined one of the receptive levels. If the most recent level is invalid because of expiration of an effective period of the data of the most recent level, then receptivity calculating section 17 of this example sets the receptivity to the predetermined default level.

In this example, control unit 1 is a computer system including at least one CPU, and one or more memory sections serving as the memory section 13. The sections 12, 14, 15, 16 and 17 are constituted by computer operations as mentioned later.

Figure 3:
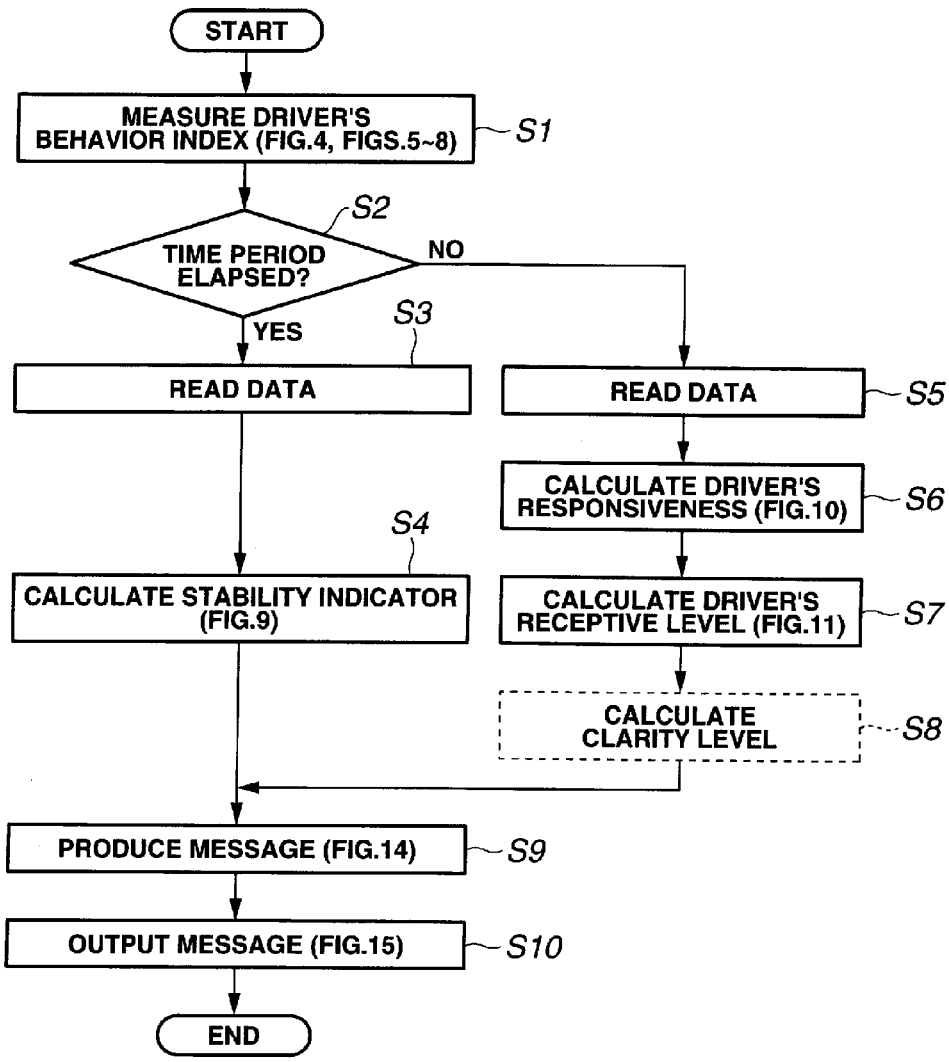
FIG. 3 is a flowchart showing a driving assist process performed by a control unit shown in FIGS. 1 and 2.

FIG. 3 shows a general flow of a control process (or vehicle driving assist process) for constituting the sections in control unit 1. At a step S1, control unit 1 first reads the outputs of the sensors 3-10, and the data (271, 272, 273) of the navigation system, and calculates or measures the (driver's driving) behavior index according to a behavior index calculating or measuring process shown in FIG. 4. Then, at a step S2, control unit 1 checks whether a predetermined time period (about 30 minutes, for example) is elapsed. From S2, control unit 1 proceeds to a step S3 when the predetermined time period is elapsed, and to a step S5 when the predetermined time period is not yet elapsed. For example, the predetermined time period of S2 is set equal to a length of time (about 30 minutes) from a start of driving of the driver until operations for all typical driving situations such as acceleration, deceleration, and steady driving are normally performed by the driver.

At step S3, control unit 1 reads data and calculation results stored in memory section 13. More specifically, control unit 1 reads the first data set for determining the long term tendency and the third data set for determining the short term tendency. When there are two or more available behavior indexes, then control unit 1 selects only one of the available behavior indexes, and reads data for the selected behavior index at S3 (and S5). (Thereafter, control unit 1 calculates the stability (stability indicator) and the responsiveness as to the selected behavior index.) After S3, control unit 1 proceeds to a step S4. At step S4, control unit 1 calculates a stability indicator (or stability index) according to a stability calculating process shown in FIG. 9 by using the first and third data sets, to indicate the assessment as to the stability level of the current driving behavior or manner of the driver. After S4, control unit 1 proceeds to a step S9.

At step S5, on the other hand, control unit 1 reads data and calculation results stored in memory section 13. In this example, control unit 1 reads the second data set for determining the reference (before) tendency and the fourth data set for determining the after tendency. When there are two or more available behavior indexes, then control unit 1 selects only one of the available behavior index, and reads data for the selected behavior index at S5. Thereafter, control unit 1 calculates the responsiveness as to the selected behavior index. After S5, control unit 1 proceeds to a step S6. At step S6, control unit 1 calculates the driver's responsiveness according to a responsiveness calculating process shown in FIG. 10. After S6, control unit 1 proceeds to a step S7.

Figure 11:
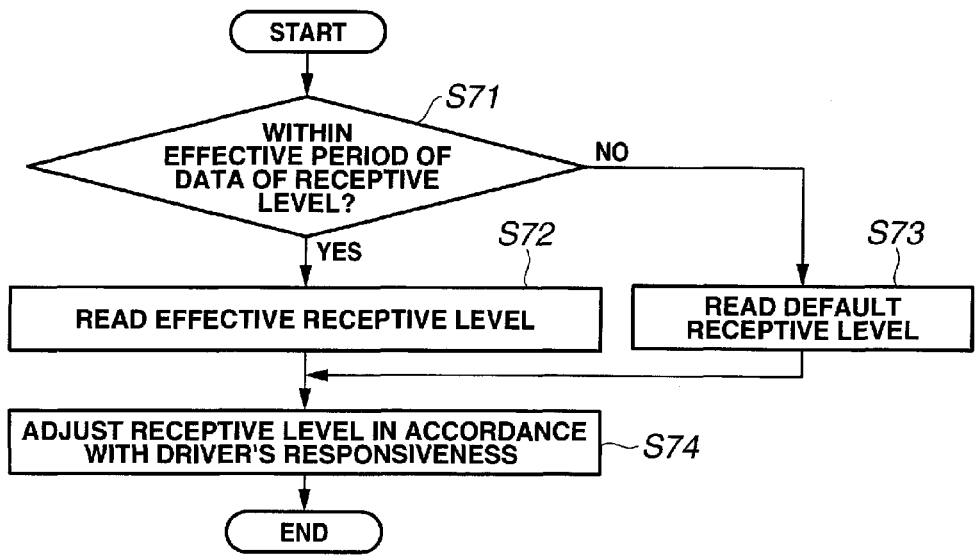
FIG. 11 is a flowchart showing a receptivity calculating process performed at a step S7 shown in FIG. 3.

At step S7, control unit 1 calculates a driver's receptivity (or receptive level) according to a receptivity calculating process shown in FIG. 11. After S7, control unit 1 proceeds to the step S9. In the first embodiment, a step S8 (FIG. 13) is eliminated, and control unit 1 proceeds from S7 directly to step S9. (In a second embodiment, control unit 1 proceeds from S7 to step S8, and calculates a message's clarity index according to a clarity calculating process shown in FIG. 13. After S8, control unit 1 proceeds to step S9.) At step S9, control unit 1 produces a message according to a message producing process shown in FIG. 14. At a step S10 following S9, control unit 1 outputs the message according to a process of FIG. 15. After S10, control unit 1 terminates the process of FIG. 3.

Figure 4:
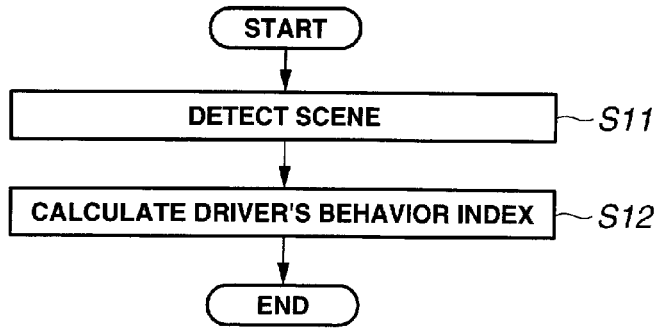
FIG. 4 is a flowchart showing a behavior index calculating process performed at a step S1 shown in FIG. 3.

FIG. 4 shows the behavior (index) calculating or measuring process performed at S1 for calculating or measuring the driver's driving behavior index. In the process of FIG. 4, control unit 1 first detects a driving scene at a step S11, and then calculates or measures the behavior index at a step S12, according to at least one of processes shown in FIGS. 5-8. Thereafter, control unit 1 proceeds to S2 shown in FIG. 3.

Figure 5:
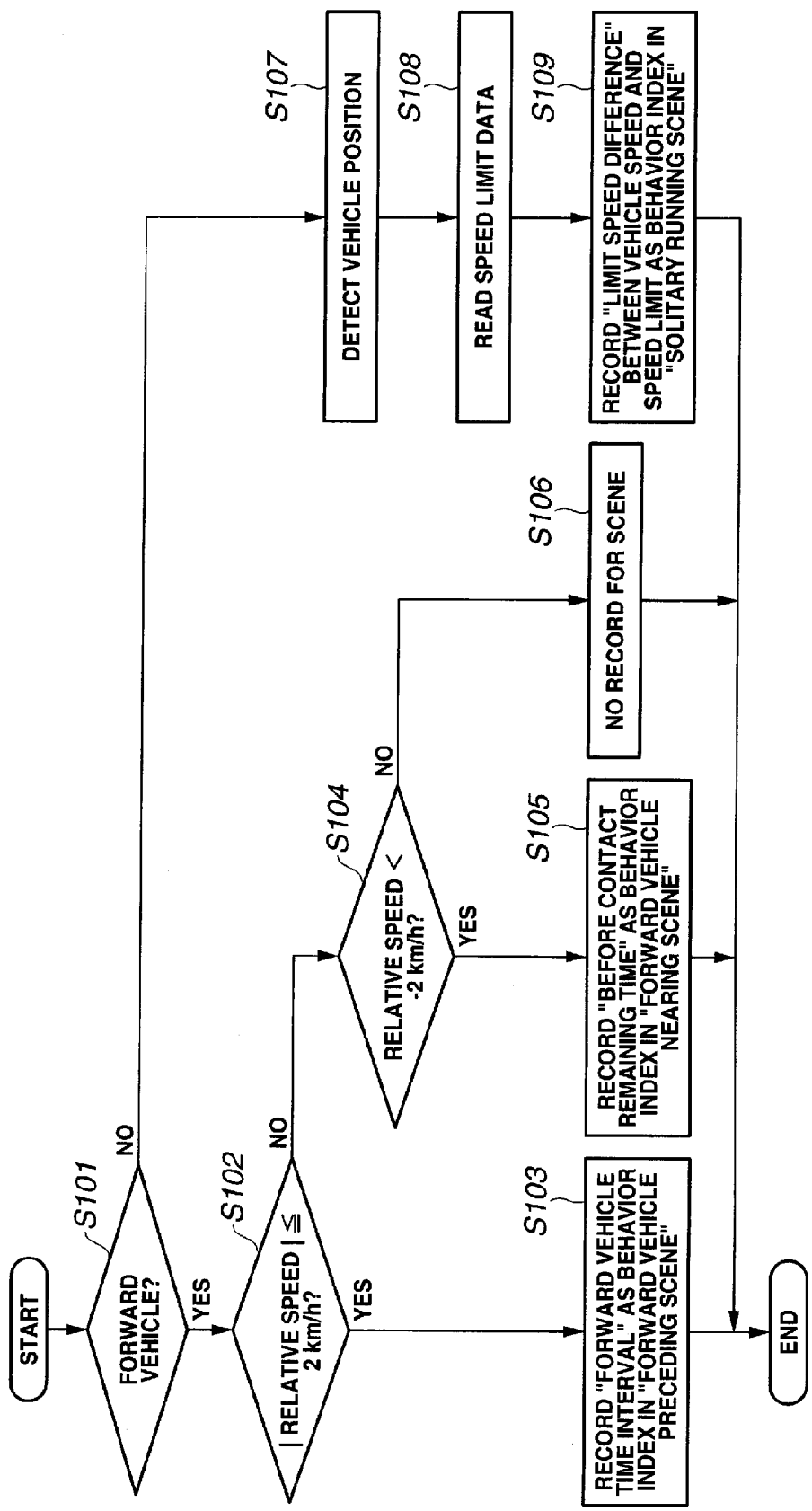
FIG. 5 is a flowchart showing a first concrete example of the behavior index calculating process of FIG. 4.

At S11, control unit 1 examines whether the current driving state of the controlled vehicle is in a predetermined scene or in one of predetermined scenes. This embodiment employs at least one of the following seven scenes each having one behavior index. The driving assist system of the illustrated example according to this embodiment employs all the seven behavior indexes in the seven scenes. (1) First behavior index is a forward vehicle interval such as a forward vehicle time interval (or time gap or headway) (which is a quotient obtained by dividing the inter-vehicle distance (or vehicle-to-vehicle space interval) between a forward (or preceding) vehicle and the controlled vehicle, by the vehicle speed of the controlled vehicle) in a forward vehicle preceding scene in which the controlled vehicle is running after the forward vehicle (FIG. 5). (2) A second behavior index is a before contact remaining time (which is a time to contact or collision (TTC) obtained by dividing the inter-vehicle distance (or space interval) between the forward vehicle and the controlled vehicle, by the relative speed between the controlled vehicle and the forward vehicle) in a forward vehicle nearing scene in which the forward vehicle is approaching to the controlled vehicle (FIG. 5). (3) A third behavior index is a limit speed difference which is a speed difference between the vehicle speed of the controlled vehicle and a road speed limit in a solitary running scene in which the controlled vehicle is running alone (FIG. 5). (4) A fourth behavior index is a start acceleration of the controlled vehicle in a from stop starting scene in which the controlled vehicle starts from a stop line or stop sign. (5) A fifth behavior index is a before stop remaining distance (which is a distance to the position of a stop line from the position of the controlled vehicle at the time of start of a brake operation) in a before stop decelerating scene in which the controlled vehicle is decelerated before a stop line. (6) A sixth behavior index is a rearward vehicle interval such as a rearward vehicle time interval (which is a quotient obtained by dividing the inter-vehicle distance (or space interval) between a rearward (or following) vehicle and the center vehicle, by the vehicle speed of the controlled vehicle) in a rearward vehicle following scene in which the controlled vehicle is followed by the rearward vehicle. (7) A seventh behavior index is a fluctuation index which, in this example is a steering entropy (representing the level of fluctuation in the form of entropy (meaning a measure of disorder, randomness, or irregularity) in a straight running scene in which the controlled vehicle is running straight ahead. In this example, control unit 1 calculates or measure all these behavior indexes and collects values of these behavior indexes when the conditions of any one of the predetermined scenes are met. However, as mentioned before, control unit 1 determines the stability and the receptivity or responsiveness of the driver by selecting only one behavior index for the calculation.

FIG. 5 shows, as an example, an behavior index measuring process for discriminating among the forward vehicle preceding scene, forward vehicle nearing scene and solitary running scene, and calculating the corresponding behavior indexes. At a step S101, control unit 1 examines whether a forward vehicle is detected by forward sensor 9 or not. From S101, control unit 1 proceeds to a step S102 when a forward vehicle is detected, and to a step S107 when no forward vehicle is detected.

At step S102, control unit 1 examines whether the absolute value of the relative speed between the forward vehicle sensed by forward sensor 9 and the controlled vehicle is equal to or lower than a preset value (2 km/h, in this example). From S102, control unit 1 proceeds to a step S103 when the absolute value of the relative speed is lower than or equal to the predetermined value (2 km/h), and to a step S104 when it is not.

At step S103, control unit 1 considers that the condition of the forward vehicle preceding scene is satisfied, calculates the forward vehicle time interval (or time gap or headway) by dividing the forward vehicle space interval (the inter-vehicle distance between the forward vehicle and the controlled vehicle) by the vehicle speed of the controlled vehicle, and stores the calculated value of the forward vehicle time interval as the first behavior index of the driver. After S103, control unit 1 terminates the process of FIG. 5 and proceeds to step S2 shown in FIG. 3.

At step S104, control unit 1 examines whether the relative speed between the forward vehicle detected by forward sensor 9 and the controlled vehicle is lower than a predetermined value (negative value) (−2 km/h, in this example) or not. From S102, control unit 1 proceeds to a step S105 when the relative speed is lower than the predetermined value (−2 km/h), and to a step S106 when it is not.

At step S105, control unit 1 judges that the condition of the forward vehicle nearing scene is satisfied, calculates the before contact remaining time (TTC) by diving the forward vehicle space interval between the forward vehicle detected by forward sensor 9 and the controlled vehicle, by the relative speed between the forward vehicle and the controlled vehicle, and stores the calculated value of the before contact remaining time as the second behavior index. After S105, control unit 1 proceeds to step S2 of FIG. 3. At step S106, control unit 1 judges that neither the forward vehicle preceding scene nor the forward vehicle nearing scene is detected, and stores no new values of the behavior indexes. After S106, control unit 1 proceeds to step S2 of FIG. 3.

At step S107, control unit 1 determines the position of the controlled vehicle by using the output of vehicle position sensor 3 and data obtained from the navigation system. After S107, control unit 1 reads the data on the speed limit of the road currently under the controlled vehicle at a step S108, and then proceeds to a step S109. At S109, control unit 1 judges that the condition of the solitary running scene is satisfied, calculates the limit speed difference by subtracting the speed limit from the vehicle speed of the controlled vehicle, and stores the calculated value of the limit speed difference as the third behavior index. After S109, control unit 1 proceeds to step S2 of FIG. 3.

Figure 6:
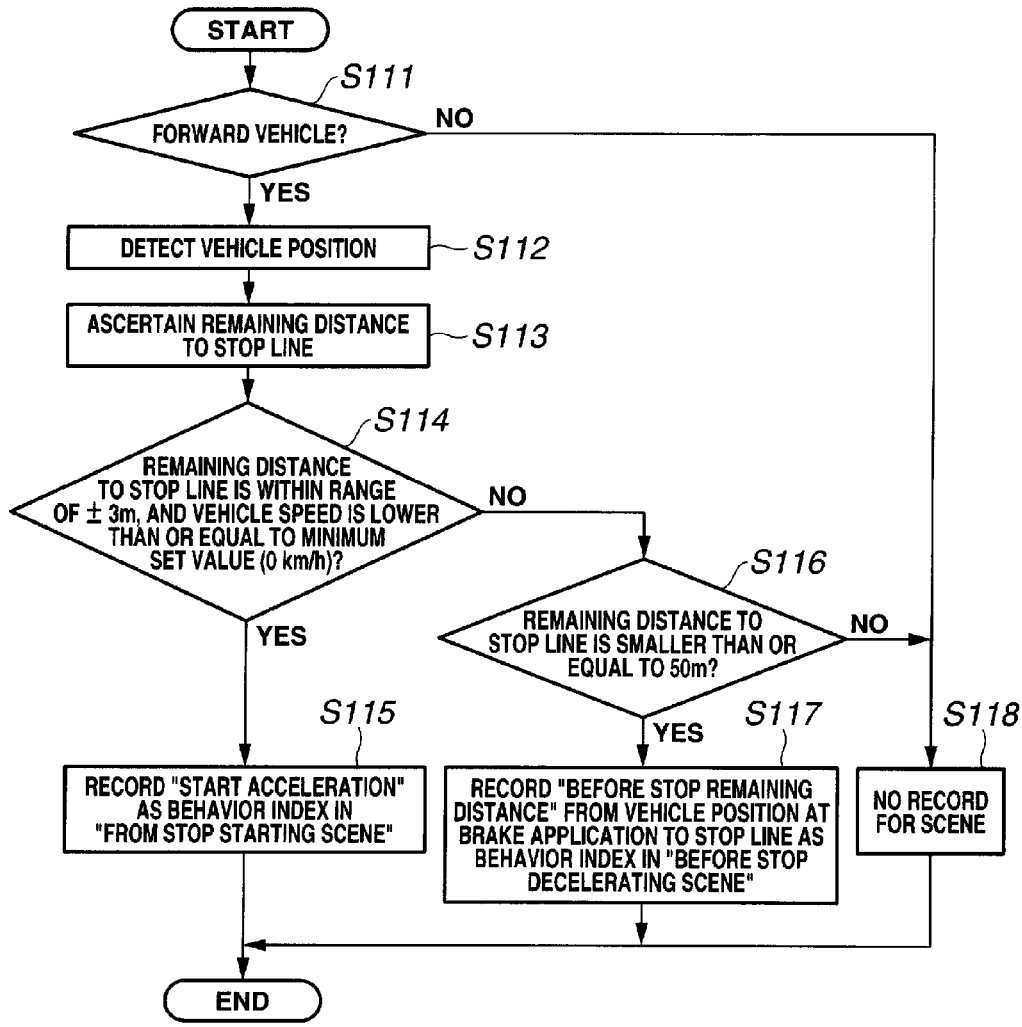
FIG. 6 is a flowchart showing a second concrete example of the behavior index calculating process of FIG. 4.

FIG. 6 shows, as another example, an behavior index measuring process for discriminating among the from stop starting scene and the before stop decelerating scene, and calculating the corresponding behavior indexes. At a step S111, control unit 1 examines whether a forward vehicle is detected by forward sensor 9 or not. From S111, control unit 1 proceeds to a step S112 when a forward vehicle is detected, and to a step S118 when no vehicle is detected ahead by forward sensor 9.

At S112, control unit 1 determines the position of the controlled vehicle by using the output of vehicle position sensor 3, and the data of the navigation system. At a step S113 next to S112, control unit 1 determines the distance from the controlled vehicle to the position of a stop line of the road by using the data of the navigation system. At a step S114 next to S113, control unit 1 examines whether the distance to the stop line is within a predetermined range (of plus or minus 3 m, for example) and at the same time the vehicle speed of the controlled vehicle is within a predetermined minimum range (0 km/h). When the distance to the stop line is equal to or smaller than the upper limit (+3 m) of the predetermined range and equal to or greater than the lower limit (−3 m), and the vehicle speed is within the minimum range (the vehicle speed is equal to 0 km/h, in this example), then control unit 1 proceeds to a step S115. When the answer of S114 is negative, control unit 1 proceeds to a step S116.

At step S115, control unit 1 judges that the condition of the from stop starting scene is satisfied, determines a start acceleration which, in this example, is the maximum acceleration within a predetermined time period (3 sec, for example) from a start of the vehicle, and stores the calculated value of the start acceleration as the fourth behavior index. After S115, control unit 1 proceeds to S2 of FIG. 3.

At step S116, control unit 1 examines whether the distance to the stop line is equal to or smaller than a predetermined value (50 m, for example). From S115, control unit 1 proceeds to a step S117 when the distance to the stop line is equal to or smaller than the predetermined value (50 m), and to step S118 when it is not. At S117, control unit 1 judges that the condition of the before stop decelerating scene is satisfied, calculates the distance from the position of the controlled vehicle at the time of a start of a driver's brake operation to the position of the stop line, and stores the calculated value as the fifth behavior index. After S117, control unit 1 proceeds to S2 of FIG. 3. At step S118, control unit 1 judges that neither the condition of the from stop starting scene nor the condition of the before stop decelerating scene are satisfied, and proceeds to S2 of FIG. 3 without recording any value of the behavior index.

Figure 7:
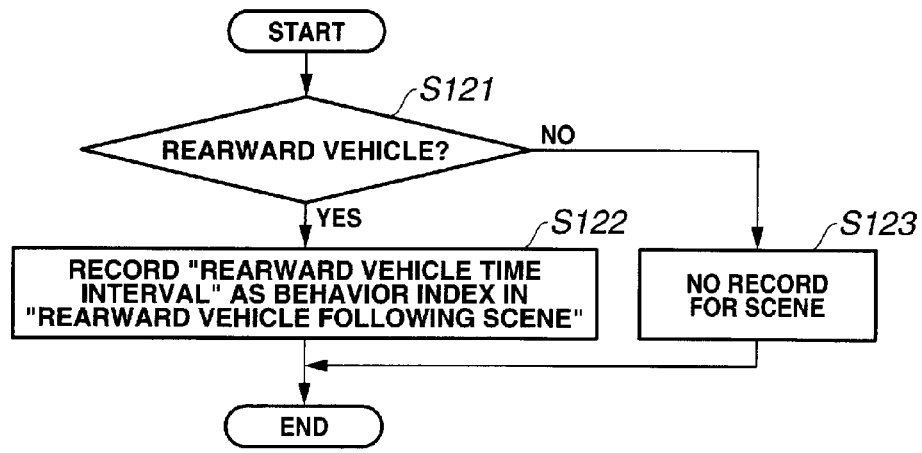
FIG. 7 is a flowchart showing a third concrete example of the behavior index calculating process of FIG. 4.

FIG. 7 shows, as still another example, an behavior index measuring process for discriminating the rearward vehicle following scene, and calculating the corresponding behavior index. At a step 5121, control unit 1 examines whether a rearward vehicle is detected by rearward sensor 10 or not. From S121, control unit 1 proceeds to a step S122 when a rearward vehicle is detected, and to a step S123 when no rearward vehicle is detected.

At step S122, control unit 1 judges that the condition of the rearward vehicle following scene is satisfied, calculates the rearward vehicle time interval by dividing the rearward vehicle space interval (the inter-vehicle distance between the rearward vehicle and the controlled vehicle) by the vehicle speed of the controlled vehicle, and stores the calculated value of the rearward vehicle time interval as the sixth behavior index of the driver. After S122, control unit 1 proceeds to step S2 shown in FIG. 3. At step S123, control unit 1 judges that the condition of the rearward vehicle following scene is not satisfied, and proceeds to S2 of FIG. 3 without recording a value of the behavior index.

Figure 8:
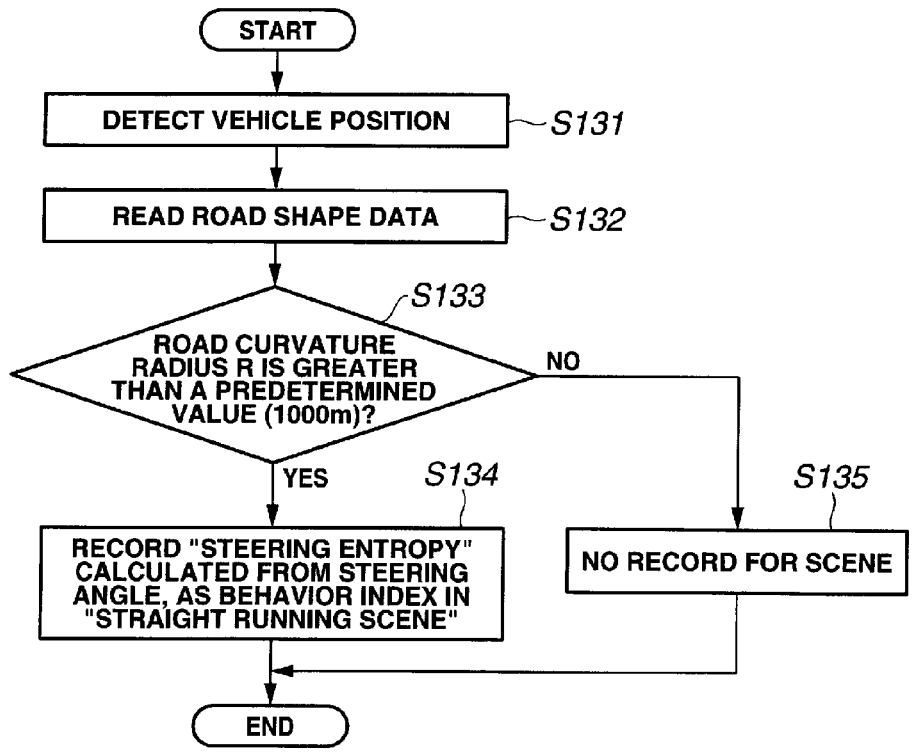
FIG. 8 is a flowchart showing a fourth concrete example of the behavior index calculating process of FIG. 4.

FIG. 8 shows, as still another example, an behavior index measuring process for discriminating the straight running scene, and calculating the corresponding behavior index. At a step S131, control unit 1 determines the position of the controlled vehicle by using the output of vehicle position sensor 3 and the data of the navigation system. At a step S132 next to S131, control unit 1 ascertains the data on the road shape in the navigation system.

At a step S133 next to S132, control unit 1 examines the road shape data obtained at S132, and determines whether the curvature radius R of the road currently under the controlled vehicle is greater than a predetermined value (1000 m, for example). From S133, control unit 1 proceeds to a step S134 when the road curvature radius R is greater than the predetermined value (1000 m), and to a step S135 when the road curvature radius is equal to or smaller than the predetermined value (1000 m). At S134, control unit 1 judges that the condition of the straight running scene is satisfied, calculates the fluctuation index (such as steering entropy), from variation of the steering angle sensed by steering angle sensor 4, and stores the calculated value of the fluctuation index as the seventh behavior index of the driver. After S134, control unit 1 proceeds to S2 of FIG. 3. At step S135, control unit 1 judges the condition of the straight running scene is not satisfied, and proceeds to S2 of FIG. 3 without recording data of the behavior index.

Figure 9:
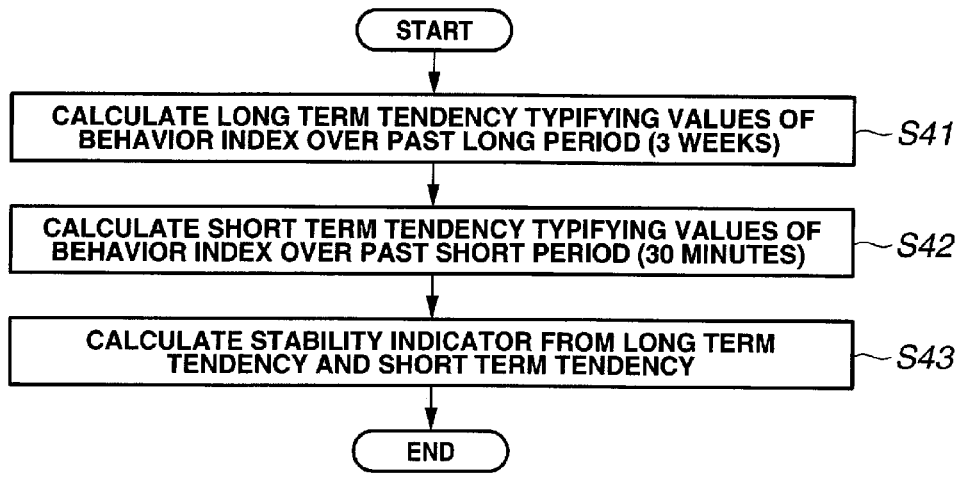
FIG. 9 is a flowchart showing a stability calculating process performed at a step S4 shown in FIG. 3.

FIG. 9 shows the stability calculating process performed at S4 of FIG. 3. This process includes three process sections(or steps). A first step S41 is a process section of calculating a long term (or usual) tendency (or average) which is a quantity typifying a collection (or subset) of values of the (selected) behavior index accumulated during a past (most recent) long time period (three weeks, in this example). The long term tendency may be an arithmetic mean of the collection of the value of the behavior index, or may be a predetermined cumulative frequency rate. The cumulative frequency rate is a value of the selected behavior index including a predetermined percentage of data, such as a value of the vehicle time interval containing 25% of the data, or a value of the steering entropy containing 75% of the data. It is possible to determine the percentage adequately in accordance with the selected behavior index. In these examples, the setting is shifted to the side evaluating the stability more stringently.

A second step S42 next to S41 is a process section of calculating a short term (or current) tendency (or average) which is a quantity (a typical value such as an arithmetic mean) typifying a collection (or subset) of values of the (selected) behavior index accumulated during a past or most recent short time period (30 minutes, in this example) in the same manner as in S41 for the long term tendency.

A third step S43 next to S42 is a process section of calculating a stability indicator (or stability parameter) from the long term (usual) tendency or behavior calculated at S41 and the short term (current) tendency or behavior calculated at S42. In this example, the stability indicator is equal to the difference obtained by subtracting the short term tendency from the long term tendency. j Accordingly, in the case of the forward vehicle time interval in the forward vehicle preceding scene, the before contact remaining time in the forward vehicle nearing scene, the before stop remaining distance in the before stop decelerating scene and the rearward vehicle time interval in the rearward vehicle following scene, the current tendency or behavior is higher in the stability than the usual tendency or behavior when the stability indicator is negative, and the current tendency or behavior is lower in the stability when the stability indicator is positive. In the case of the limit speed difference in the solitary running scene (when the vehicle speed is over the speed limit), the start acceleration in the from start accelerating scene and the steering entropy in the straight running scene, the current tendency or behavior is higher in the stability than the usual tendency when the stability indicator is positive, and the current tendency or behavior is lower in the stability when the stability indicator is negative.

Figure 10:
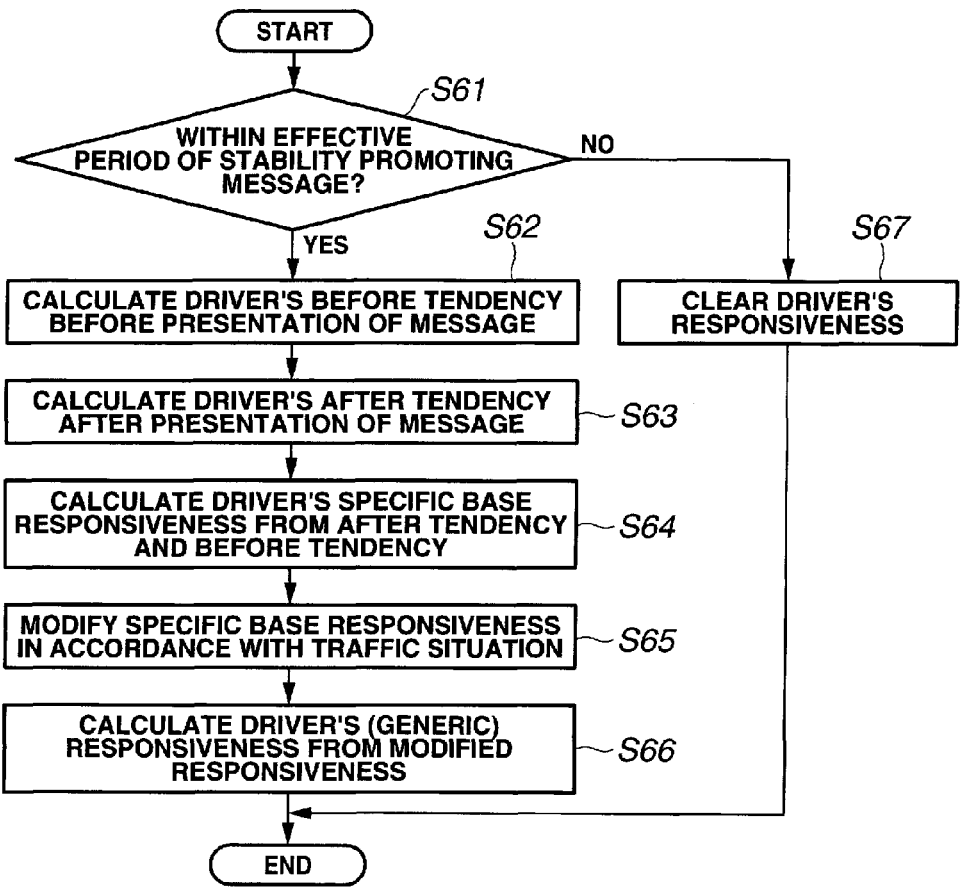
FIG. 10 is a flowchart showing a driver's responsiveness calculating process performed at a step S6 shown in FIG. 3.

FIG. 10 shows the driver's responsiveness calculating process performed at S6 of FIG. 3. A step S61 is a process section of checking whether an effective period of a (later-mentioned) stability promoting message expires. From S61, control unit 1 proceeds to a step S62 when the effective period of the stability promoting message is still in progress, and to a step S67 after the expiration of the effective period of the stability promoting message. As the effective period of a stability promoting message, it is possible to set a period of a predetermined number of hours, a period until a change in the type of the road on which the controlled vehicle is running, such as a change from a highway road to an ordinary road, a period until the engine of the vehicle is stopped, a period until a change of the date, a period until the destination of the navigation system is changed, or a period until a change in drivers. It is possible to detect a change of drivers, by detecting an operation of adjusting the seat position, the angle of a door minor or inside rearview mirror, or a change of cards of an electronic toll collection system. At S67, control unit 1 clears the data of the driver's responsiveness without calculating the driver's responsiveness.

Step S62 is a process section of calculating a before tendency or behavior (or reference behavior) before the time of most recent presentation of the stability promoting message to the driver. The before tendency of the driver is used as a reference value for calculating the driver's responsiveness. The before tendency is a quantity or typical value (such as arithmetic mean) typifying a collection of values of the (selected) behavior index accumulated during a predetermined measuring period (such as 30 minutes) ending at or before the time of the most recent presentation of the stability promoting message. It is possible to omit this calculation of the before tendency, by calculating the typical value of data collected over the past 30 minutes whenever a stability promoting message is presented, and by storing the calculated typical value in the memory.

Step S63 is a process section of calculating an after tendency or behavior (driving behavior) after the time of the (most recent) presentation of the stability promoting message to the driver. The after tendency is a quantity or typical value (such as an arithmetic means) typifying a collection of values of the (selected) behavior index accumulated during the predetermined measuring period (such as 30 minutes) starting after the time of the (most recent) presentation of the stability promoting message. After S63, control unit 1 proceeds to a step S64.

Step S64 is a process section of calculating a base specific responsiveness of the driver by subtracting the after tendency determined at S63 from the before tendency determined at S62. After S64, control unit 1 proceeds to a step S65. The base specific responsiveness is positive or negative in dependence on the selected behavior index, as listed in Table 1. Table 1 shows the signs of the first through seventh behavior indexes when the driver responds to the presentation of the stability promoting message.

Step S65 is a process section of modifying the base specific responsiveness determined at S64, in accordance with a traffic situation, thereby to determine a modified specific responsiveness of the driver. Step S65 is designed to modify the driver's responsiveness in accordance with the traffic situation when there is a factor influencing the behavior index at the time of measurement of the after tendency. When some factor of the traffic situation makes it difficult to respond adequately to the stability promoting message, then the driver's responsiveness is mitigated even if the specific responsiveness is deteriorated. When some factor of the traffic situation inevitably causes a response of the driver independently of preference or tendency of the driver, then the driver's responsiveness is estimated lower even if the specific responsiveness is higher. In this example, control unit 1 performs the following modifications for the seven behavior indexes. In this example, the modified specific responsiveness is determined by multiplying the base specific responsiveness determined at S64 by a modification coefficient (⅔, for example). When there is no need for modification, the modified specific responsiveness is equal to the base specific responsiveness.

In the case of the forward vehicle time interval in the forward vehicle preceding scene, the base specific responsiveness is modified in the following two modifying modes. (i) First, the base specific responsiveness is multiplied by a modification coefficient (which is equal to ⅔ in this example) when the controlled vehicle is followed by a rearward vehicle, the rearward vehicle time interval is so short as to make it difficult to increase the forward vehicle space interval to the forward vehicle, and the base specific responsiveness is positive. For example, it is possible to judge that the rearward vehicle time interval is so short, when the percentage of the time during which the rearward vehicle time interval is equal to or smaller than a predetermined amount (2 sec, for example) is greater than or equal to a predetermined percent (50%, for example) of a time period for measurement. (ii) Second, the base specific responsiveness is multiplied by a modification coefficient (⅔, for example) when the percentage of the time during which the vehicle speed of the forward vehicle is higher than the speed limit of the road is greater than 50% (the state in which the forward vehicle space interval tends to become greater), and the base specific responsiveness is negative.

In the case of the before contact remaining time (TTC) in the forward vehicle nearing scene, the modified specific responsiveness is determined by multiplying the base specific responsiveness by a modification coefficient (⅔ in this example) (i) when the arithmetic mean of the deceleration of the forward vehicle during the past short period (30 minutes, for example) is equal to or higher than a predetermined value (2.45 m/s², for example) (that is the state in which the forward vehicle space interval tends to become shorter) and the base specific responsiveness is positive, or (ii) when the arithmetic mean of the acceleration of the forward vehicle is equal to or higher than a predetermined value (1.5 m/s², for example) (that is the state in which the forward vehicle space interval tends to become longer) and the base specific responsiveness is negative.

In the case of the limit speed difference in the solitary running scene, the modified specific responsiveness is determined by multiplying the base specific responsiveness by a modification coefficient (⅔ in this example) (i) when the controlled vehicle is followed by a rearward vehicle, the percentage of the time during which the rearward vehicle time interval to the rearward vehicle is equal to or greater than a predetermined value (50%, for example) (that is, the state in which the rearward vehicle space interval is small and the deceleration of the controlled vehicle is not easy), and the base specific responsiveness is negative, or (ii) when the weather has changed within a most recent short period (30 minutes) from fair or cloudy to rain (that is the state in which the visibility becomes lower and the speed of the controlled vehicle tends to become lower), and the base specific responsiveness is positive.

In the case of the start acceleration in the from stop starting scene, the modified specific responsiveness is determined by multiplying the base specific responsiveness by a modification coefficient (⅔ in this example) (i) when the percentage of the case in which a rearward vehicle is behind the controlled vehicle when starting from a stop line is greater than or equal to a predetermined value (50%, for example) (that is, the state in which the start acceleration tends to become greater) and the base specific responsiveness is negative, or (ii) when the percentage of the case in which the data of the navigation system shows congestion in a road ahead of the controlled vehicle is greater than a predetermined value (50%, for example)(that is, the state in which the start acceleration tends to become smaller) and the base specific responsiveness is positive.

In the case of the before stop remaining distance in the before stop decelerating scene, the modified specific responsiveness is determined by multiplying the base specific responsiveness by a predetermined modification coefficient (⅔, for example) (i) when the percentage of the case in which the controlled vehicle is followed by a rearward vehicle at the time of deceleration before a stop line is greater than or equal to a predetermined value (50%, for example) of the total data amount (that is, the controlled vehicle is in the state in which the timing of the brake application tends to be earlier so as to notify the rearward vehicle of the existence of the forward stop line) and the base responsiveness is negative, or (ii) when the percentage of the case of rainy weather at the time of deceleration before a stop line is greater than or equal to a predetermined value (50%, for example)(that is, the controlled vehicle is in the state in which the visibility is low and the timing of brake application tends to later) and the base responsiveness is positive.

In the case of the rearward vehicle time interval in the rearward vehicle following scene, the modified specific responsiveness is determined by multiplying the base specific responsiveness by a predetermined modification coefficient (⅔, for example) (i) when a forward vehicle is preceding, the percentage of the case in which the forward vehicle time interval is equal to or smaller than a predetermined value (2 sec, for example) is greater than or equal to a predetermined percentage (50%, for example) (that is, the controlled vehicle is in the state in which the forward vehicle space interval is small, the controlled vehicle tends to be decelerated and the rearward vehicle space interval tends to become smaller) and the base responsiveness is positive, or (ii) when the percentage of the case in which the vehicle speed of the rearward vehicle is lower than or equal to a half of the speed limit of the road is greater than or equal to a predetermined percentage (50%, for example) among the total amount of data (that is, the controlled vehicle is in the state in which the vehicle speed of the rearward vehicle is slow and the rearward vehicle space interval tends to become longer) and the base responsiveness is negative.

In the case of the steering entropy in the straight running scene, the modified specific responsiveness is determined by multiplying the base specific responsiveness by a predetermined modification coefficient (⅔, for example) (i) the arithmetic mean of the road curvature radius over a most recent time interval (of 30 minutes, for example) is smaller than or equal to a predetermined smaller value (500 m, for example) (that is, the state in which the road is gradually curved and the corrective steering operation tends to become frequent) and the base responsiveness is negative, or (ii) when the arithmetic mean of the road curvature radius over a most recent time interval (of 30 minutes, for example) is greater than or equal to a predetermined greater value (1000 m, for example) (that is, the state in which the road is almost straight and the corrective steering operation tends to become less frequent) and the base responsiveness is positive.

Step S66 is a process section of calculating a driver's generic responsiveness (DGR) of the driver in accordance with the modified specific responsiveness (DSR) determined at S65. The specific responsiveness is different in scale and dimension from one behavior index to another. Accordingly, step S66 is designed to calculate the generic responsiveness from the specific responsiveness so that the scale and dimension are the same for the responsiveness for all the behavior indexes. After S66, control unit 1 proceeds to S7 of FIG. 3. In this example, the control unit 1 determines the driver's generic responsiveness (DGR) from the specific responsiveness (DSR) according to Table 2.

In the example of Table 2, as to the forward vehicle time interval in the forward vehicle preceding scene, DGR=1 when DSR is smaller than or equal to −1 sec, DGR=−1 when DSR is greater than or equal to 0.3 sec, and DGR=0 when DSR is in a range greater than −1 sec and smaller than 3 sec. As to the before contact remaining time in the forward vehicle nearing scene, DGR=1 when DSR is smaller than or equal to −2 sec, DGR=−1 when DSR is greater than or equal to 1 sec, and DGR=0 when DSR is in a range greater than −2 sec and smaller than 1 sec. As to the limit speed difference in the solitary running scene, DGR=1 when DSR is greater than or equal to 10 km/h, DGR=−1 when DSR is smaller than or equal to −5 km/h, and DGR=0 when DSR is in a range greater than −5 km/h and smaller than 10 km/h. As to the start acceleration in the from stop starting scene, DGR=1 when DSR is greater than or equal to 0.5 m/s², DGR=−1 when DSR is smaller than or equal to −0.2 m/s², and DGR=0 when DSR is in a range greater than −0.2 m/s² and smaller than 0.5 m/s². As to the before stop remaining time in the before stop decelerating scene, DGR=1 when DSR is smaller than or equal to −10 m, DGR=−1 when DSR is greater than or equal to 3 m, and DGR=0 when DSR is in a range greater than −10 m and smaller than 3 m. As to the rearward vehicle time interval in the rearward vehicle following scene, DGR=1 when DSR is smaller than or equal to −1 sec, DGR=−1 when DSR is greater than or equal to 0.3 sec, and DGR=0 when DSR is in a range greater than −1 sec and smaller than 3 sec. As to the steering entropy in the straight running scene, DGR=1 when DSR is smaller than or equal to 0.5, DGR=−1 when DSR is greater than or equal to 1.0, and DGR=0 when DSR is in a range greater than 0.5 and smaller than 1.

FIG. 11 shows the receptivity calculating process performed at S7 of FIG. 3. A first step S71 is a process section of examining whether the data of the receptivity (receptive level) is within an effective period or not. In this example, the effective period of the data on the receptivity is set equal to one day. At S71, control unit 1 examines whether the predetermined effective period (such as one day) has passed from the time of last update of the data of the receptivity. From S71, control unit 1 proceeds to a step S72 when the data of the receptivity is valid within its effective period, and to a step S73 when the data of the responsiveness is not valid because of the expiration of the effective period.

Figure 12:
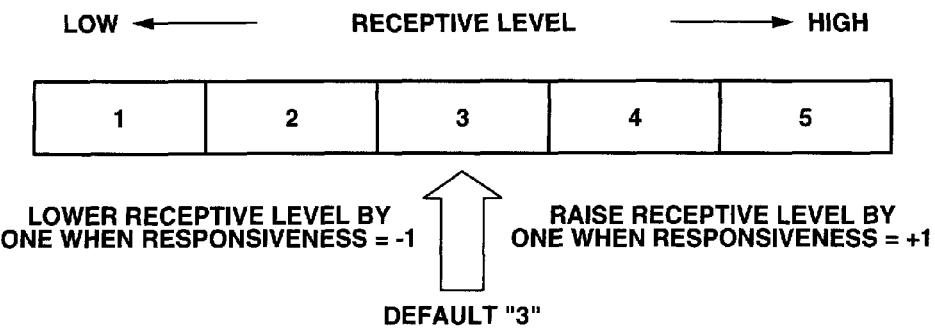
FIG. 12 is a view for illustrating a receptive level determined in the process of FIG. 11.

Step S72 is a process section of reading the stored valid receptivity (receptive level) within the effective period. After S72, control unit 1 proceeds to a step S74. In this example, the receptivity of the driver is the receptive level which is a discrete quantity assuming one of (five) levels. In an example shown in FIG. 12, the receptivity is set at one of five levels. Level 5 is a highest level and level 1 is a lowest level. The receptive level is increased from level 1 to level 5 as the receptivity becomes higher.

Step S73 is a process section of reading a default value or default level of the receptivity. After S73, control unit 1 proceeds to the step S74. In this example, the default level is set equal to a middle level (level 3) when the receptivity level is not yet determined. When the arithmetic mean of the receptive level over the most recent past three weeks is equal to or higher than level 4, then the default level is set equal to level 4. When the arithmetic mean of the receptive level over the most recent past three weeks is equal to or lower than level 2, then the default level is set equal to level 2.

Step S74 is a process section of adjusting the receptive level read at S72 or S73, in accordance with the driver's general responsiveness (DGR) (serving as an adjustment quantity) calculated in the process of FIG. 10 at S6. After S74, control unit 1 terminates the process of FIG. 11 and proceeds to step S9 shown in FIG. 3 (directly in the first embodiment, or through step S8 in the second embodiment). At S74, the receptive level is raised by one level from the level read at S72 or S73 when the driver's general responsiveness is +1. The receptive level is lowered by one level from the level read at S72 or S73 when the driver's general responsiveness is −1. The receptive level is held unchanged at the level read at S72 or S73 when the driver's general responsiveness is 0.

Figure 13:
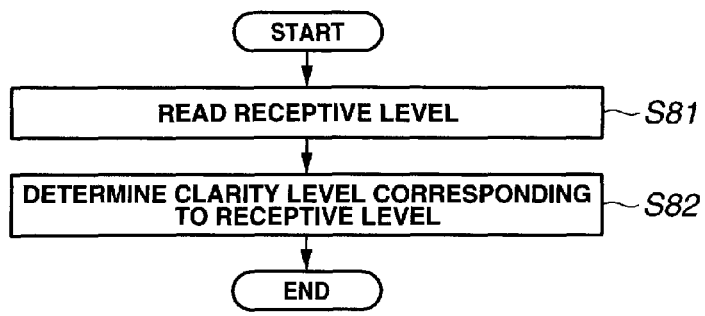
FIG. 13 is a flowchart showing a clarity level determining process performed at a step S8 shown in FIG. 3, according to a second embodiment of the present invention.

FIG. 13 shows the clarity calculating process performed at S8 of FIG. 3 in the case of the second embodiment. Step S8 and hence FIG. 13 are omitted in the first embodiment. A first step S81 is a process section of reading the receptive level calculated in the process of FIG. 11 at S7 of FIG. 3. A second step S82 is a process section of determining a clarity level in accordance with the receptive level according to Table 3. In this example of Table 3, the clarity level is lowered as the receptive level becomes higher. In the example of Table 3, the clarity level is set to one when the receptive level is 5, and the clarity level is set to 5 when the receptive level is 1. The second embodiment is substantially identical to the first embodiment except for the use of the clarity level.

Figure 14:
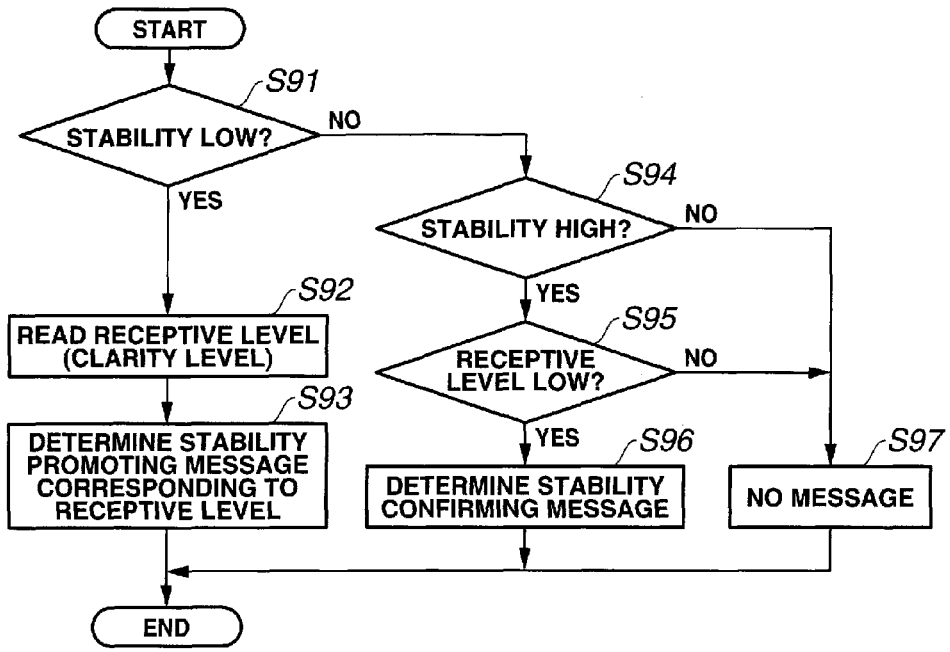
FIG. 14 is a flowchart showing a message producing or preparing process performed at a step S9 shown in FIG. 3.

FIG. 14 shows the message producing process performed at S9 of FIG. 3. A first step S91 is a process section of examining whether the stability (stability indicator) is lower than a predetermined stability level, or not. From S91, control unit 1 proceeds to a step S92 when the stability is lower than the predetermined stability level, and to a step S94 when the stability is not low. For this evaluation of the stability, control unit 1 of this example uses the stability indicator calculated in the process of FIG. 9 at S4 for one of the behavior indexes as shown in Table 4. In the case of the first behavior index of the forward vehicle time interval in the forward vehicle preceding scene, for example, control unit 1 judges the stability to be low (the answer of S91 is YES) when the stability indicator based on the forward vehicle time interval is greater than or equal to 1 sec, and judges the stability to be high when the stability indicator is smaller than or equal to −1 sec.

In the case of the second behavior index of the before contact remaining time in the forward vehicle nearing scene, control unit 1 judges the stability to be low when the stability indicator based on the before contact remaining time is greater than or equal to 2 sec, and judges the stability to be high when the stability indicator is smaller than or equal to −2 sec. In the case of the third behavior index of the limit speed difference in the solitary running scene, control unit 1 judges the stability to be low when the stability indicator based on the limit speed difference is lower than or equal to −10 km/h and judges the stability to be high when the stability indicator is greater than or equal to 10 km/h. In the case of the fourth behavior index of the start acceleration in the from stop starting scene, control unit 1 judges the stability to be low when the stability indicator based on the start acceleration is lower than or equal to −1 m/s$^2$, and judges the stability to be high when the stability indicator is higher than or equal to 1 m/s$^2$.

In the case of the fifth behavior index of the before stop remaining distance in the before stop decelerating scene, control unit 1 judges the stability to be low when the stability indicator based on the before stop remaining distance is greater than or equal to 10 m, and judges the stability to be high when the stability indicator is smaller than or equal to −10 m. In the case of the sixth behavior index of the rearward vehicle time interval in the rearward vehicle following scene, control unit 1 judges the stability to be low when the stability indicator based on the rearward vehicle time interval is greater than or equal to 1 sec, and judges the stability to be high when the stability indicator is smaller than or equal to −1 sec. In the case of the seventh behavior index of the steering entropy in the straight running scene, control unit 1 judges the stability to be low when the stability indicator based on the steering entropy is smaller than or equal to −0.5, and judges the stability to be high when the stability indicator is greater than or equal to 0.2.

Step S92 is a process section of reading the receptivity (receptive level) of the driver calculated in the process of FIG. 11 at S7 of FIG. 3 in the case of the first embodiment (or the clarity level calculated from the receptivity in the process of FIG. 13 at S8 in the second embodiment). From S92, control unit 1 proceeds to a step S93.

Step S93 is a process section of determining (or producing) a stability promoting message corresponding to receptivity (receptive level in the first embodiment) (or the clarity level in the second embodiment) read at S92. After S93, control unit 1 proceeds to S10 of FIG. 3. At S93, control unit 1 according to the first embodiment determines the presentation mode of the stability promoting message according to at least one of the following eight practical examples as explained later.

Step S94 is a process section of examining whether the stability is high or not, by using Table 4 as in the examination of S91, in this example. After S94, control unit 1 proceeds to a step S95 when the stability is high, and to a step S97 when the stability is not high. Step S95 is a process section of examining whether the receptivity (receptive level) of the driver is low or not. After S95, control unit 1 proceeds to a step S96 when the receptivity is low, and to a step S97 when the receptivity is not low.

Step S96 is a process section of producing a stability confirming message. After S96, control unit 1 proceeds to step S10 of FIG. 3. The stability confirming message (or high stability message) is a message notifying the driver that the current driving behavior is safe in the visual form and/or audible form. The driving assist system can let the driver of a low receptivity, to know the current safe driving behavior, by providing an affirmative message.

At step S97, control unit 1 terminates the process of FIG. 14 without producing a message, and proceeds to step S10 of FIG. 3. At step S97, no message is produced. From S97, control unit 1 proceeds to S10 of FIG. 3 without producing any message.

Figure 15:
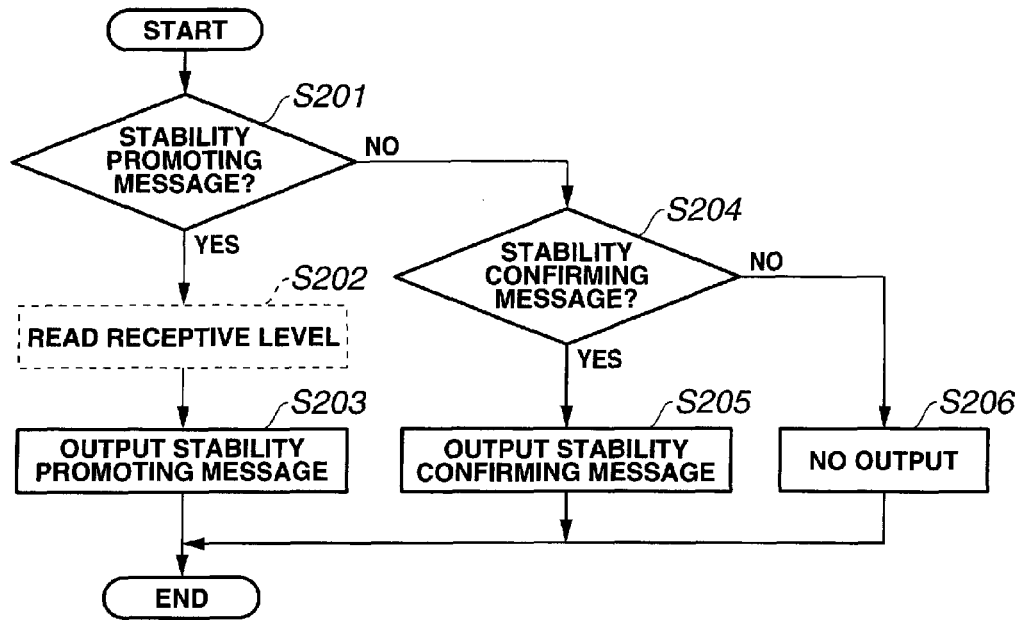
FIG. 15 is a flowchart showing a message outputting process performed at a step S10 shown in FIG. 3.

FIG. 15 shows a message outputting process performed at S10 of FIG. 3. A first step S201 is a process section of examining whether a stability promoting message is produced in the process of FIG. 14 at S9, or not. From S201, control unit 1 proceeds to a step S202 (or directly to a step S203 in the case in which S202 is omitted) when a stability promoting message is produced, and to a step S204 when no stability promoting message is produced. Step S202 is a process section of reading the receptivity (receptive level) of the driver calculated in the process of FIG. 11 at S7. (Step S202 may be omitted when all of the stability promoting message are determined at S93.) After S202 (or directly from S201), control unit 1 proceeds to step S203. At S203, control unit 1 outputs the stability promoting message produced in accordance with the driver's receptivity (receptive level), through the output section (261, 262, 11). After S203, control unit 1 returns to the main program of FIG. 3

Step S204 is a process section of examining whether a stability confirming message is produced in the process of FIG. 14 at S9 or not. From S204, control unit 1 proceeds to a step S205 when a stability confirming message is produced, and to a step S206 when no stability confirming message is produced. At S205, control unit 1 outputs the stability confirming message through the output section to the driver of a relatively low receptivity. At step S206, no message is outputted. After S205 or S206, control unit 1 returns to the main program of FIG. 3.

At step S93 of FIG. 14, control unit 1 according to the first embodiment determines the presentation mode of a stability promoting message in accordance with the driver's receptivity (receptive level) according to at least one of the following eight practical examples. The presentation mode is determined by at least one of a presentation form (visual, audible or tactile), expression (used herein to mean contents of message, including (written or spoken) text, pictorial matter and/ or pattern (such as pattern of vibrations)), strength (such as strength or level of stimulation) and frequency (frequency of presentation of a message).

In a first practical example, assist information is presented to the driver in the form of a visual message (V) through visual output device 261. The expression and strength of the visual message are adjusted in accordance with the driver's receptivity. Table 5 shows, as an example, adjustment of the expression of a visual message, and Table 6 shows, as an example, adjustment of the strength (size, blink, color and/or other factors) of the visual message. In the first practical example, at S93, control unit 1 reads data on the presentation form in accordance with the driver's receptivity from the information as shown in Table 5 and Table 6. For example, the visual message may include a visual written text such as "Stability can be increased by increasing vehicle interval (or inter-vehicle interval)." for level 1; "Stability is lower (or low)." for level 2; "Comparison between usual and now (or current)." for level 3; "Driving state now (or current driving state)." for level 4; and "Mean vehicle time interval 1.5 sec." FIGS. 16A~16E show images on the display screen of visual output device 261 employed in the first practical example. In the example of FIG. 16 (16A~16E), both the expression and strength are varied among five levels, in accordance with the receptive level. However, as shown in Table 7, it is possible to employ a second adjustment mode of varying the expression in dependence on the receptive level and fixing the strength unchanged as in an example shown in FIGS. 17A~17E, or a third adjustment mode of fixing the expression unchanged and varying the strength in dependence on the receptive level, as in an example shown in FIGS. 18A~18E.

In a second practical example, assist information is presented to the driver in the form of an audible message (A) through audible output device 262. The expression and strength of the audible message are adjusted in accordance with the driver's receptivity. Table 8 shows, as an example, adjustment of the expression of an audible message, and Table 9 shows, as an example, adjustment of the strength (loudness, repetition etc.) of the audible message. In the second practical example, at S93, control unit 1 reads data on the presentation form in accordance with the driver's receptivity from the information as shown in Table 8 and Table 9. Table 10 shows, as an example, spoken texts outputted through audio output device 262, in accordance with the receptive level. In the example of Table 10, both the expression and strength of the audio message are varied among five levels, in accordance with the receptive level. However, it is optional to employ various adjustment modes as shown in Table 11, including an adjustment mode of varying the audio expression in dependence on the receptive level and fixing the audio strength unchanged as shown in Table 12, or an adjustment mode of fixing the audio expression unchanged and varying the audio strength in dependence on the receptive level, as shown in Table 13.

In a third practical example (T+V), assist information is presented to the driver in the form of a visual message (V) through visual output device 261 and a tactile message (T) through tactile output device 11. Since it is not easy to communicate assist information to the driver only with the output of tactile output device 11 in some cases, the third practical example employs a visual message in addition to the tactile message. Table 14 shows, as an example, adjustment of the strength of the tactile message (vibrations of steering wheel 101) depending on the receptive level, and Table 15 shows, as an example, adjustment of the the tactile message outputted together with the visual message which is fixed in the expression and strength at the image of FIG. 18E without regard to the receptive level. In the example of Table 15, the strength of the tactile message can be adjusted among five levels in dependence on the driver's receptive level. However, it is possible to adjust the expression and/or strength of the visual message in accordance with the driver's receptive level, together with the adjustment of the tactile message in dependence on the receptive level or the fixation of the tactile message, as shown in Table 16. In Table 16, a mode of fixing all the three factors (the visual expression, visual strength and tactile strength) is not included in the third practical example.

In the third practical example, it is possible to vary either or both of the expression and strength of the visual message in dependence on the driver's receptive level as in the first practical example. Possible examples are: a first adjustment mode of varying the visual expression and fixing the strength of the visual message in dependence on the receptive level as shown in FIGS. 17A~17E, in addition to the fixed tactile message of vibrating the steering wheel at 100 Hz during a duration (of 3 sec) without regard to the driver's receptive level; a second adjustment mode of fixing the visual expression but varying the visual strength in dependence on the receptive level as shown in FIGS. 18A~18E, in addition to the fixed tactile message of vibrating the steering wheel at 100 Hz during a duration (of 3 sec); and a third adjustment mode of varying the visual expression and strength in dependence on the receptive level as shown in FIGS. 16A~16E, in addition to the fixed tactile message of vibrating the steering wheel at 100 Hz during a duration (of 3 sec).

In the third practical example, it is possible to vary either or both of the expression and strength of the visual message in dependence on the driver's receptive level with adjustment of the tactile message, as in a fourth adjustment mode of varying the visual expression and fixing the strength of the visual message in dependence on the receptive level as shown in FIGS. 17A~17E in addition to the adjustment of the tactile message (vibrations of the steering wheel) in dependence on the driver's receptive level as shown in Table 15; a fifth adjustment mode of fixing the visual expression but varying the visual strength in dependence on the receptive level as shown in FIGS. 18A~18E in addition to the adjustment of the tactile message in dependence on the driver's receptive level as shown in Table 15; and a sixth adjustment mode of varying the visual expression and strength in dependence on the receptive level as shown in FIGS. 16A~16E in addition to the adjustment of the tactile message in dependence on the driver's receptive level as shown in Table 15. The fixation of one of the factors is convenient in some cases in which the adjustment of the output level is unfeasible because of an output device being of an on/off type incapable of adjusting the output level.

In a fourth practical example (T+A), assist information is presented to the driver in the form of an audible message through audible output device 262 and a tactile message through tactile output device 11. The third practical example employs the tactile plus visual (T+V) presentation mode whereas the fourth embodiment employs the tactile plus audible (T+A) presentation mode. Therefore, in the fourth practical example, too, it is possible to employ various adjusting modes, as shown in Table 17.

In a fifth practical example, assist information is presented to the driver in the form of a visual message through visual output device 261 and an audible message through audio output device 262. In this practical example, too, it is possible to employ various adjusting modes, as shown in Table 18.

In a sixth practical example (V+A+T), assist information is presented to the driver in the form of a visual message through visual output device 261, an audible message through audio output device 262 and a tactile message through tactile output device 11. It is possible to employ various adjusting modes, as shown in Table 19.

In a seventh practical example (selection from V, A and T), assist information is presented to the driver in the form selecting any one or more of a visual message through visual output device 261, an audible message through audio output device 262 and a tactile message through tactile output device 11. Table 20 shows, as an example, an adjusting mode employing the visual form and the audible form for all the five levels, and employing the tactile form only for the level 2 and level 1. Thus, the driving assist system increases the number of the presentation forms as the receptivity becomes lower, and thereby presents the assist information to the driver with more forms when the driver's receptivity is lower. Table 21 shows a concrete example. In the example of Table 21, the system adjust the presenting mode by varying one or more factors of the expressions and strengths in accordance with the receptivity as well as selecting the presentation forms. It is possible to employ various adjusting modes as mentioned in the preceding practical examples.

In an eighth practical example (adjustment of probability of presentation in V, A and/or T), assist information is presented to the driver by varying the probability of presentation in accordance with the receptive level, in the form of any one or more of a visual message, an audible message and a tactile message as in one of the first through seventh practical examples. As shown in an example of Table 22, the probability is decreased as the receptivity becomes higher.

If one of the scenes continues, a stability promoting message could be outputted repeatedly at intervals of 30 minutes, and the frequent presentation of the assist information could be bothersome to a highly receptive driver. Therefore, in one example, when the driver's receptive level is five, the assist information is presented only in the visual form (small image) with the probability set at a smallest value (such as 5%). When the receptive level is four, the probability is increased to a greater value (such as 25%), with the presentation form including only the visual form (larger image). When the receptive level is three, the probability is further increased to a greater value (such as 50%), with the presentation form including the visual form (larger image) and the audible form (small volume). When the receptive level is two, the probability is further increased to a greater value (such as 75%), with the presentation form including the visual form (larger image) and the audible form (greater volume). When the receptive level is one, the probability is increased to a greatest value (such as 95%), with the presentation form including the visual form (larger image), the audible form (great volume) and the tactile form (haptic). If a stability promoting message is produced when the periodical presentation is not carried out, it is possible to present a small visual message "Stability Diagnosis: Please see when the vehicle is stopped." In this case, the assist information is presented to the driver according to the need of the driver when the vehicle is at rest.

According to the illustrated embodiments, a vehicle driving assist technique (apparatus or method) comprises: an input element (such a section of the apparatus or an operation of the method) for sensing a vehicle traveling condition (which may include at least one of a running condition and a surrounding condition); an output element for presenting assist information to a driver of the vehicle (which can be referred to as a controlled vehicle or a central vehicle); and a control element for preparing the assist information in accordance with the vehicle traveling condition sensed by the sensing section. The control element may be arranged to determine an estimation quantity of the driver, and to adjust the assist information to the driver (for example, by adjusting a presentation mode of a next presentation of the assist information to the driver) in accordance with the estimation quantity of the driver. The estimation quantity may be a quantity representing the receptivity of the driver (representing readiness or willingness to receive or accept the assist information). For example, the estimation quantity representing the receptivity may be the driver's receptivity, or may be a quantity representing a reaction of the driver to a (most recent) presentation of the assist information to the driver. In the illustrated embodiments, the estimation quantity representing the receptivity may include at least one of the driver's receptivity, driver's responsiveness, driver's driving tendency or behavior and the difference between the after tendency and the reference (or before) tendency. Accordingly, this technique can present the assist information adequately to the driver in accordance with (most recent) driving behavior of the driver. This technique may further include any one or more of the following features (C1)~(C31).

(C1) The control element may estimate a driver's receptivity (such as a receptive level) and adjust the assist information in accordance with the driver's receptivity, as the estimation quantity. (C2) The control element may be configured to calculate a driver's responsiveness to the assist information, in accordance with (a variation of) the vehicle traveling condition, and to adjust the assist information in accordance with the driver's responsiveness (for example, by estimating the receptivity from the responsiveness). (C3) The control element may be configured to determine a driver's driving behavior (such as a driving tendency) from the vehicle traveling condition, and to adjust the assist information in accordance with the driving behavior (for example, by determining the driver's estimation quantity or the driver's responsiveness from the driving behavior). (C4) The control element may be configured to determine an index parameter indicative of a driving behavior or a driver's reaction to presentation of the assist information, from the vehicle traveling condition, to calculate the estimation quantity (such as a driving tendency, as the driving behavior), from one or more values of the index parameter, and to adjust the assist information in accordance with the estimation quantity (for example, by determining the receptivity from a variation of the driving tendency). (C5) The control element may be configured to calculate a difference between an after tendency (or after average) which is a quantity typifying a collection of values of the index parameter collected after (most recent) presentation of the assist information to the driver, and a reference tendency (such as a before tendency or before average), and to determine the estimation quantity for adjusting the assist information from the difference (for example, by calculating the responsiveness from the difference). (C6) The control element may be configured to examine whether a predetermined condition of a predetermined scene is satisfied, to determine a value of a behavior index, as the index parameter, from the vehicle traveling condition when the predetermined condition of the predetermined scene is satisfied, to calculate the driving tendency, as the driving behavior, from the value of the behavior index as the index parameter, and to determine the receptivity of the driver from a variation of the driving tendency.

(C7) The control element may be configured to set the estimation quantity (such as the receptivity) to a most recently determined value when the most recently determined value is available (within an effective period), to set the estimation quantity to a predetermined initial value (such as a default level) when the most recently determined value is not available, and to update the estimation quantity (for example, by adjusting the receptivity in accordance with the responsiveness of the driver). (C8) The estimation quantity (such as the receptivity) may be a discrete quantity assuming one of different levels. (C9) The control element may be configured to determine a stability of the vehicle or a stability of a driver's driving behavior, and to produce a message to present the assist information in accordance with the stability. In this case, the control element may be configured to produce a message for promoting the stability when the stability is low and to produce a message for confirming the stability when the stability is high. (C10) The control element may be configured to determine a long term tendency (such as a quantity typifying a collection of values of the index parameter collected during a (past) longer period (3 weeks, for example) starting from a past time point and ending at a current time point or (most recently) before the current time point) representing a long term driving behavior of the driver and a short term tendency (such as a quantity typifying a collection of values of the index parameter collected during a shorter period (30 min, for example) starting from a past time point and ending at a current time point or (most recently) before the current time point) representing a short term driving behavior of the driver, and to vary the assist information in accordance with the deviation of the short term tendency from the long term tendency.

(C11) The control element may be configured to determine a presentation mode (visual, audible or tactile form, expression, strength and frequency) to present the assist information to the driver, in accordance with the estimation quantity (such as the receptivity) of the driver, and to present the assist information through the output section to the driver in the presentation mode determined in accordance with the estimation quantity of the driver. (C12) The control element may be configured to determine the presentation mode by determining a presentation form which includes at least one of a visual form, an audible form and a tactile form, in accordance with the estimation quantity (receptivity) of the driver. (C13) The control element may be configured to determine the presentation mode by determining at least one of expression (or contents) of presentation of the assist information, strength (or degree of stimulation) of the presentation of the assist information, and a frequency of the presentation of the assist information, in accordance with the estimation quantity (such as the receptivity).

(C14) The control element may include a sub-element of selecting at least one of the visual, audible and tactile forms in accordance with the estimation quantity (such as the receptivity). (C15) The control element may be configured to vary at least one of the expression and the strength of a message of the assist information in accordance with the estimation quantity (such as the receptivity) when the visual or audible form is selected. (C16) The control element may be configured to vary the strength of a tactile message in accordance with the estimation quantity (such as the receptivity) when the tactile form is selected, and to use at least one of a visual message and an audible message together with the tactile message. (C17) The control element may be configured to increase the directness or the straightforwardness of the expression of a message for promoting the stability as the receptivity (or the receptive level) of the driver is higher. (C18) The control element may be configured to increase the opportunity of, or increase the frequency of, presentation of the assist information to the driver as the receptivity of the driver is lower. (C19) The control element may be configured to increase the number of presentation forms as the receptivity of the driver is lower.

(C20) The control element may be configured to present a message to confirm that the stability is high, when the driver's receptivity is low and the stability (such as the stability indicator) is high. (C21) The control element may be configured to determine the receptivity in the form of a receptive level assuming one of different levels, and to set the receptive level to a predetermined initial level when the receptivity cannot be determined or when the receptivity is undeterminable. (C22) The control element may be configured to determines a driver's driving behavior at the time of presentation of the assist information to the driver, and updates the driver's receptive level by adjusting (lowering, raising or holding unchanged) the most recently determined level of the receptive level in accordance with the determined driver's driving behavior. (C23) The control element may be configured to initialize the driver's receptive level, periodically at regular time intervals, to an initial level which is determined in accordance with the receptivity. (C24) The control element may be configured to present a message to confirm that the stability is high, when the driver's receptivity is low and the stability (such as the stability indicator) is high.

(C25) The input element may include a sensing element to sense the vehicle traveling condition including at least one of a vehicle running condition of the controlled vehicle and a surrounding condition around the controlled vehicle. (C26) The sensing element is configured to sense the vehicle traveling condition including at least one of the vehicle running condition which includes at least one of a vehicle accelerating/braking condition (such as vehicle speed, vehicle acceleration and the instant of brake application), and a steering condition (such as a steering wheel displacement), and the surrounding condition which includes at least one of a (GPS) vehicle position of the controlled vehicle, a road condition (such as stop line position, and road shape) and an external vehicle condition (such as conditions to determine relative speed and time or space interval with respect to a forward or rearward vehicle). (C27) The control element may be configured to determine an index parameter which includes at least one of (i) a forward vehicle (time or space) interval to a forward vehicle preceding the controlled vehicle, (ii) a before contact remaining time remaining until contact with a forward vehicle to which the controlled vehicle is nearing, (iii) a limit speed difference between the vehicle speed and a speed limit of a road, (iv) a start acceleration, (v) a before stop remaining distance from the vehicle position at the time of brake application to a stop line ahead, (vi) a rearward vehicle (time or space) interval to a rearward vehicle following the controlled vehicle, and (vii) (the degree of) a steering disorder (such as the steering entropy), in accordance with the vehicle traveling condition, and to determine the estimation quantity (the receptivity) of the driver in accordance with (one or more values of) the index parameter of the driver. (C28) The control element may be configured to determine an adjustment quantity (such as the general responsiveness shown in Table 2) in accordance with the responsiveness of the driver, and to adjust the receptivity in accordance with the adjustment quantity. (C29) The assist information (such as a stability promoting message) may be provided with an effective period. (C30) The control element may be configured to determine a value of the estimation quantity (such as the driver's receptivity), to regard the value of the estimation quantity as being valid until the expiration of a predetermined effective period, and to regard the value invalid at the expiration of the predetermined effective period. (C31) The control element may be configured to determine the responsiveness of the driver by modifying the difference between the after tendency and the before tendency, in accordance with a traffic situation.

According to another aspect of the illustrated embodiment of the present invention, a vehicle driving assist apparatus or method may comprise: an input section configured to sense a vehicle traveling condition of a vehicle; an output section configured to present assist information to a driver of the vehicle; and a control section configured to prepare the assist information in accordance with the vehicle traveling condition, the control section being further configured to periodically calculate an index parameter indicative of a driving behavior of the driver, from the vehicle traveling condition, to calculate an estimation quantity which is a difference between an after tendency typifying a collection of values of the index parameter collected after (most recent) presentation of the assist information to the driver, and a reference tendency (such as a before tendency typifying a collection of values of the physical parameter collected before the (most recent) presentation of the assist information to the driver), and to adjust the assist information in accordance with the difference between the after tendency and the reference tendency.

This application is based on a prior Japanese Patent Application No. 2008-177532 with a filing date of Jul. 8, 2008 in Japan. The entire contents of this prior Japanese Patent Application are hereby incorporated by reference. Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

TABLE 1

| BEHAVIOR INDEX | SIGN |
|---|---|
| 1 FORWARD VEHICLE TIME INTERVAL IN FORWARD VEHICLE PRECEDING SCENE | MINUS |
| 2 BEFORE CONTACT REMAINING TIME IN FORWARD VEHICLE NEARING SCENE | MINUS |
| 3 LIMIT SPEED DIFFERENCE IN SOLITARY RUNNING SCENE | PLUS |
| 4 START ACCELERATION IN FROM STOP STARTING SCENE | PLUS |
| 5 BEFORE STOP REMAINING DISTANCE IN BEFORE STOP DECELERATING SCENE | MINUS |
| 6 REARWARD VEHICLE TIME INTERVAL IN REARWARD VEHICLE FOLLOWING SCENE | MINUS |
| 7 STEERING ENTROPY IN STRAIGHT RUNNING MODE | PLUS |

TABLE 2

| | DRIVER'S GENERIC RESPONSIVENESS (DGR) (ADJUSTMENT QUANTITY) | | |
|---|---|---|---|
| BEHAVIOR INDEX | −1 | 0 | +1 |
| 1 FORWARD VEHICLE TIME INTERVAL | DSR ≥ 0.3 sec | −1 sec < DSR < 0.3 sec | DSR ≤ −1 sec |
| 2 BEFORE CONTACT REMAINING TIME | DSR ≥ 1 sec | −2 sec < DSR < 1 sec | DSR ≤ −2 sec |
| 3 LIMIT SPEED DIFFERENCE | DSR ≤ −5 km/h | −5 km/h < DSR < 10 km/h | DSR ≥ 10 km/h |
| 4 START ACCELERATION | DSR ≤ −0.2 m/s$^2$ | −0.2 m/s$^2$ < DSR < 0.5 m/s$^2$ | DSR ≥ 0.5 m/s$^2$ |
| 5 BEFORE STOP REMAINING DISTANCE | DSR ≥ 3 m | −10 m < DSR < 3 m | DSR ≤ −10 m |
| 6 REARWARD VEHICLE TIME INTERVAL | DSR ≥ 0.3 sec | −1 sec < DSR < 0.3 sec | DSR ≤ −1 sec |
| 7 STEERING ENTROPY | DSR ≥ 0.1 | 0.5 < DSR < 1 | DSR ≤ 0.5 |

(DSR = Driver's Specific Responsiveness)

TABLE 3

| RECEPTIVE LEVEL | CLARITY LEVEL |
|---|---|
| 5 | 1 |
| 4 | 2 |
| 3 | 3 |
| 2 | 4 |
| 1 | 5 |

TABLE 4

| | STABILITY JUDGMENT | | |
|---|---|---|---|
| BEHAVIOR INDEX | HIGHER STABILITY | NO CHANGE | LOWER STABILITY |
| 1 FORWARD VEHICLE TIME INTERVAL | SI ≤ −1 sec | −1 sec < SI < 1 sec | SI ≥ 1 sec |
| 2 BEFORE CONTACT REMAINING TIME | SI ≤ −2 sec | −2 sec < SI < 2 sec | SI ≥ 2 sec |
| 3 LIMIT SPEED DIFFERENCE | SI ≥ 10 km/h | −10 km/h < SI < 10 km/h | SI ≤ −10 km/h |
| 4 START ACCELERATION | SI ≥ 1 m/s$^2$ | −1 m/s$^2$ < SI < 1 m/s$^2$ | SI ≤ −1 m/s$^2$ |
| 5 BEFORE STOP REMAINING DISTANCE | SI ≤ −10 m | −10 m < SI < 10 m | SI ≥ 10 m |
| 6 REARWARD VEHICLE TIME INTERVAL | SI ≤ −1 sec | −1 sec < SI < 1 sec | SI ≥ 1 sec |
| 7 STEERING ENTROPY | SI ≥ 0.2 | −0.5 < SI < 0.2 | SI ≤ −0.5 |

(SI = STABILITY INDICATOR)

TABLE 5

| RECEPTIVE LEVEL | EXPRESSION OF VISUAL MESSAGE |
|---|---|
| 5 | CURRENT DRIVING TENDENCY |
| 4 | CURRENT BEHAVIOR INDEX DISTRIBUTION |
| 3 | CURRENT BEHAVIOR INDEX DISTRIBUTION & USUAL DRIVING BEHAVIOR INDEX DISTRIBUTION |
| 2 | CURRENT STABILITY LEVEL IN TEXT FROM DIFFERENCE BETWEEN CURRENT AND USUAL DISTRIBUTIONS |
| 1 | RECOMMENDATION IN TEXT |

TABLE 6

| RECEPTIVE LEVEL | STRENGTH OF VISUAL MESSAGE |
|---|---|
| 5 | SMALL IMAGE AT CORNER OF SCREEN |
| 4 | SMALL IMAGE AT CENTER OF SCREEN |
| 3 | LARGE IMAGE AT CENTER OF SCREEN |
| 2 | LARGE IMAGE AT CENTER WITH BLINKING |
| 1 | FULL SCREEN IMAGE WITH BLINKING |

TABLE 7

| ADJUSTMENT MODE | EXPRESSION OF VISUAL MESSAGE | STRENGTH OF VISUAL MESSAGE |
|---|---|---|
| 1 (FIG. 16) | VARIABLE | VARIABLE |
| 2 (FIG. 17) | VARIABLE | FIXED |
| 3 (FIG. 18) | FIXED | VARIABLE |

TABLE 8

| RECEPTIVE LEVEL | EXPRESSION OF AUDIBLE MESSAGE |
|---|---|
| 5 | CURRENT DRIVING TENDENCY |
| 4 | CURRENT BEHAVIOR INDEX QUALITATIVELY |
| 3 | CURRENT STABILITY AS COMPARED TO USUAL |
| 2 | RECOMMENDATION ADVIOSORILY |
| 1 | RECOMMENDATION IMPERATIVELY |

TABLE 9

| RECEPTIVE LEVEL | STRENGTH OF AUDIBLE MESSAGE |
|---|---|
| 5 | VERY SMALL VOLUME |
| 4 | SMALL VOLUME |
| 3 | MEDIUM VOLUME |
| 2 | LARGE VOLUME |
| 1 | LARGE VOLUME REPEATEDLY |

TABLE 10

| RECEPTIVE LEVEL | AUDIBLE MESSAGE |
|---|---|
| 5 | "RECENT MEAN VEHICLE TIME INTERVAL IS 1.5 SECOND" ONE OUTPUT AT 30 db |
| 4 | "VEHICLE INTERVAL TENDS TO BE SHORT" ONE OUTPUT AT 40 db |
| 3 | "VEHICLE TIME INTERVAL IS SHORTER THAN USUAL, AND STABILITY TENDS TO BE LOW" ONE OUTPUT AT 50 db |
| 2 | "STABILITY CAN BE INCREASED BY INCREASING VEHICLE INTERVAL" ONE OUTPUT AT 60 db |
| 1 | "PLEASE INCREASE VEHICLE INTERVAL TO INCREASE STABILITY" THREE OUTPUTS AT 60 db |

TABLE 11

| ADJUSTMENT MODE | EXPRESSION OF AUDIBLE MESSAGE | STRENGTH OF AUDIBLE MESSAGE |
|---|---|---|
| 1 (TABLE 10) | VARIABLE | VARIABLE |
| 2 (TABLE 12) | VARIABLE | FIXED |
| 3 (TABLE 13) | FIXED | VARIABLE |

TABLE 12

| RECEPTIVE LEVEL | AUDIBLE MESSAGE |
|---|---|
| 5 | "RECENT MEAN VEHICLE TIME INTERVAL IS 1.5 sec" |
| 4 | "VEHICLE INTERVAL TENDS TO BE SHORT." |
| 3 | "VEHICLE INTERVAL IS SHORTER THAN USUAL AND STABILITY TENDS TO BE LOW." |
| 2 | "STABILITY CAN BE INCREASED BY INCREASING VEHICLE INTERVAL" |
| 1 | "PLEASE INCREASE VEHICLE INTERVAL TO INCREASE STABILITY." |

TABLE 13

| RECEPTIVE LEVEL | AUDIBLE MESSAGE |
|---|---|
| 5 | "STABILITY CAN BE INCREASED BY INCREASING VEHICLE INTERVAL" ONE OUTPUT AT 30 db |
| 4 | "STABILITY CAN BE INCREASED BY INCREASING VEHICLE INTERVAL" ONE OUTPUT AT 40 db |
| 3 | "STABILITY CAN BE INCREASED BY INCREASING VEHICLE INTERVAL" ONE OUTPUT AT 50 db |
| 2 | "STABILITY CAN BE INCREASED BY INCREASING VEHICLE INTERVAL" ONE OUTPUT AT 60 db |
| 1 | "STABILITY CAN BE INCREASED BY INCREASING VEHICLE INTERVAL" THREE OUTPUTS AT 60 db |

TABLE 14

| RECEPTIVE LEVEL | STRENGTH OF TACTILE MESSAGE (VIBRATIONS) |
|---|---|
| 5 | LOW FREQUENCY VIBRATIONS FOR A BRIEF MOMENT |
| 4 | HIGH FREQUENCY VIBRATIONS FOR A BRIEF MOMENT |
| 3 | HIGH FREQUENCY VIBRATIONS FOR A SHORT PERIOD |
| 2 | HIGH FREQUENCY VIBRATIONS FOR A LONGER PERIOD |
| 1 | ALTERNATION OF HIGH FREQUENCY VIBRATIONS AND LOW FREQUENCY VIBRATIONS FOR A LONGER TIME |

TABLE 15

| RECEPTIVE LEVEL | TACTILE MESSAGE (STEERING WHEEL VIBRATIONS) |
|---|---|
| 5 | 50 Hz VIBRATIONS FOR 1 sec |
| 4 | 100 Hz VIBRATIONS FOR 1 sec |
| 3 | 100 Hz VIBRATIONS FOR 3 sec |
| 2 | 100 Hz VIBRATIONS FOR 5 sec |
| 1 | 100 Hz VIBRATIONS FOR 3 sec, 50 Hz VIBRATIONS FOR 2 sec, 100 Hz VIBRATIONS FOR 3 sec |

TABLE 16

| VISUAL MESSAGE | | TACTILE MESSAGE (VIBRATIONS) |
|---|---|---|
| EXPRESSION | STRENGTH | STRENGTH |
| FIXED | FIXED | VARIABLE |
|  | VARIABLE | FIXED |
|  |  | VARIABLE |
| VARIABLE | FIXED | FIXED |
|  |  | VARIABLE |
|  | VARIABLE | FIXED |
|  |  | VARIABLE |

TABLE 17

| AUDIBLE MESSAGE | | TACTILE MESSAGE (VIBRATIONS) |
|---|---|---|
| EXPRESSION | STRENGTH | STRENGTH |
| FIXED | FIXED | VARIABLE |
|  | VARIABLE | FIXED |
|  |  | VARIABLE |
| VARIABLE | FIXED | FIXED |
|  |  | VARIABLE |
|  | VARIABLE | FIXED |
|  |  | VARIABLE |

TABLE 18

| VISUAL MESSAGE | | AUDIBLE MESSAGE | |
|---|---|---|---|
| EXPRESSION | STRENGTH | EXPRESSION | STRENGTH |
| FIXED | FIXED | FIXED | VARIABLE |
|  |  | VARIABLE | FIXED |
|  |  |  | VARIABLE |
|  | VARIABLE | FIXED | FIXED |
|  |  |  | VARIABLE |
|  |  | VARIABLE | FIXED |
|  |  |  | VARIABLE |
| VARIABLE | FIXED | FIXED | FIXED |
|  |  |  | VARIABLE |
|  |  | VARIABLE | FIXED |
|  |  |  | VARIABLE |
|  | VARIABLE | FIXED | FIXED |
|  |  |  | VARIABLE |
|  |  | VARIABLE | FIXED |
|  |  |  | VARIABLE |

TABLE 19

| VISUAL MESSAGE | | AUDIBLE MESSAGE | | TACTILE MESSAGE |
|---|---|---|---|---|
| EXPRESSION | STRENGTH | EXPRESSION | STRENGTH | STRENGTH |
| FIXED | FIXED | FIXED | FIXED | VARIABLE |
|  |  |  | VARIABLE | FIXED |
|  |  |  |  | VARIABLE |
|  |  | VARIABLE | FIXED | FIXED |
|  |  |  |  | VARIABLE |
|  |  |  | VARIABLE | FIXED |
|  |  |  |  | VARIABLE |
|  | VARIABLE | FIXED | FIXED | FIXED |
|  |  |  |  | VARIABLE |
|  |  |  | VARIABLE | FIXED |
|  |  |  |  | VARIABLE |
|  |  | VARIABLE | FIXED | FIXED |
|  |  |  |  | VARIABLE |
|  |  |  | VARIABLE | FIXED |
|  |  |  |  | VARIABLE |
| VARIABLE | FIXED | FIXED | FIXED | FIXED |
|  |  |  |  | VARIABLE |
|  |  |  | VARIABLE | FIXED |
|  |  |  |  | VARIABLE |
|  |  | VARIABLE | FIXED | FIXED |
|  |  |  |  | VARIABLE |
|  |  |  | VARIABLE | FIXED |
|  |  |  |  | VARIABLE |
|  | VARIABLE | FIXED | FIXED | FIXED |
|  |  |  |  | VARIABLE |
|  |  |  | VARIABLE | FIXED |
|  |  |  |  | VARIABLE |
|  |  | VARIABLE | FIXED | FIXED |
|  |  |  |  | VARIABLE |
|  |  |  | VARIABLE | FIXED |
|  |  |  |  | VARIABLE |

TABLE 20

| RECEPTIVE LEVEL | VISUAL MESSAGE | AUDIBLE MESSAGE | TACTILE MESSAGE |
|---|---|---|---|
| 5 | ○ | ○ | |
| 4 | ○ | ○ | |
| 3 | ○ | ○ | |
| 2 | ○ | ○ | ○ |
| 1 | ○ | ○ | ○ |

TABLE 21

Figure 16A:
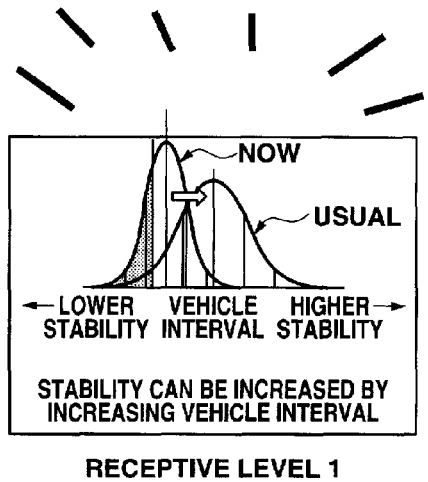
FIG. 16A is a view showing a visual image which can be employed in the embodiments of the present invention.
Figure 16B:
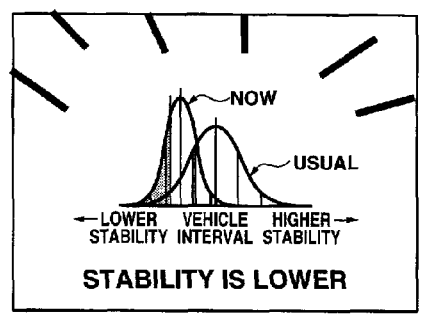
FIG. 16B is a view showing a visual image which can be employed in the embodiments of the present invention.
Figure 16C:
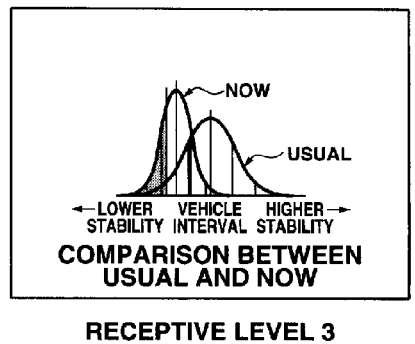
FIG. 16C is a view showing a visual image which can be employed in the embodiments of the present invention.
Figure 16D:
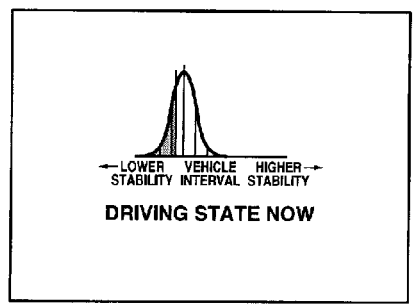
FIG. 16D is a view showing a visual image which can be employed in the embodiments of the present invention.
Figure 16E:
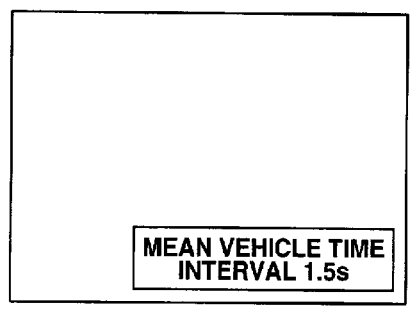
FIG. 16E is a view showing a visual image which can be employed in the embodiments of the present invention.
Figure 17A:
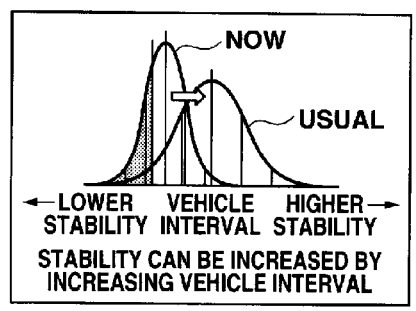
FIG. 17A is a view showing a visual image which can be employed in the embodiments of the present invention.
Figure 17B:
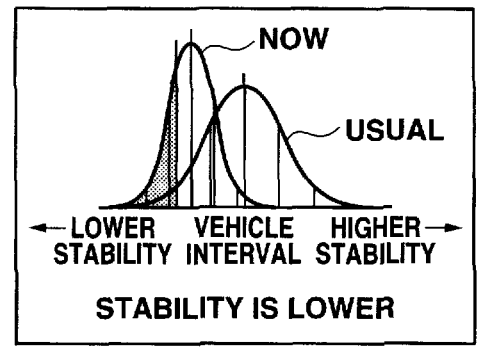
FIG. 17B is a view showing a visual image which can be employed in the embodiments of the present invention.
Figure 17C:
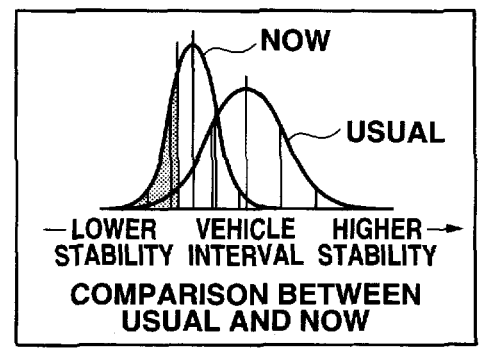
FIG. 17C is a view showing a visual image which can be employed in the embodiments of the present invention.
Figure 17D:
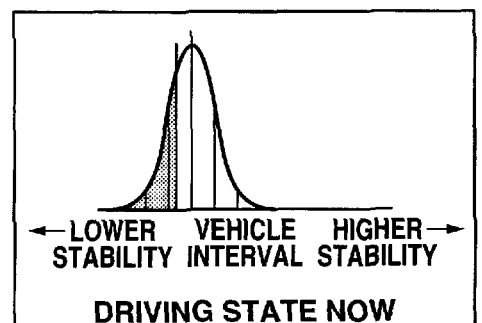
FIG. 17D is a view showing a visual image which can be employed in the embodiments of the present invention.
Figure 17E:
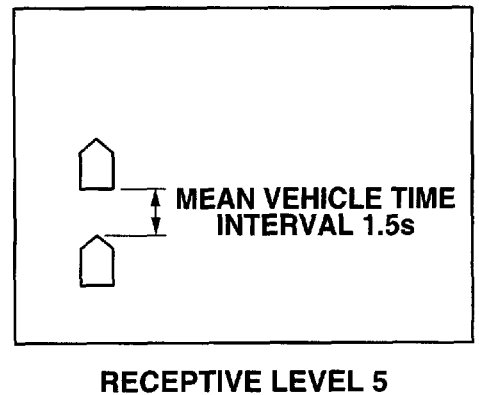
FIG. 17E is a view showing a visual image which can be employed in the embodiments of the present invention.
Figure 18A:
FIG. 18A is a view showing a visual image which can be employed in the embodiments of the present invention.
Figure 18B:
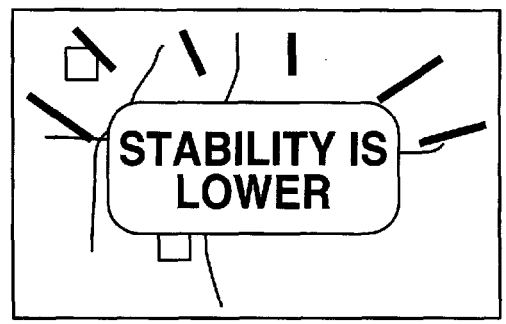
FIG. 18B is a view showing a visual image which can be employed in the embodiments of the present invention.
Figure 18C:
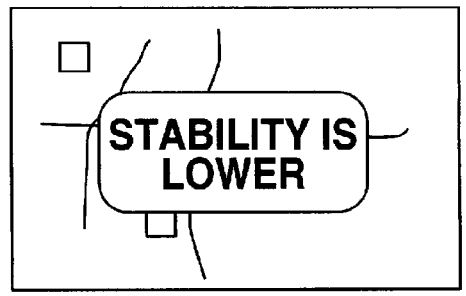
FIG. 18C is a view showing a visual image which can be employed in the embodiments of the present invention.
Figure 18D:
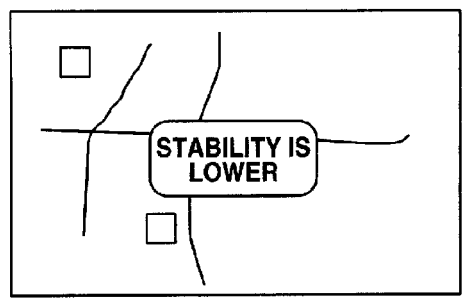
FIG. 18D is a view showing a visual image which can be employed in the embodiments of the present invention.
Figure 18E:
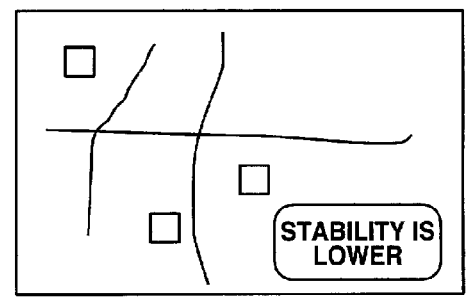
FIG. 18E is a view showing a visual image which can be employed in the embodiments of the present invention.

| RECEPTIVE LEVEL | VISUAL MESSAGE | AUDIBLE MESSAGE | TACTILE MESSAGE |
|---|---|---|---|
| 5 | FIG. 16E | "RECENT MEAN VEHICLE INTERVAL IS 1.5 sec.", ONE OUTPUT AT 30 db | |
| 4 | FIG. 16D | "VEHICLE INTERVAL TENDS TO BE SHORT." ONE OUTPUT AT 40 db | |
| 3 | FIG. 16C | "VEHICLE INTERVAL IS SHORTER THAN USUAL, AND STABILITY TENDS TO BE LOW." ONE OUTPUT AT 50 db | |
| 2 | FIG. 16B | "STABILITY IS LOW. STABILITY CAN BE INCREASED BY INCREASING VEHICLE INTERVAL" ONE OUTPUT AT 60 db | 100 HZ VIBRATIONS FOR 5 sec |
| 1 | FIG. 16A | "PLEASE INCREASE VEHICLE INTERVAL TO INCREASE STABILITY." THREE OUTPUTS AT 60 db | 100 HZ VIBRATIONS FOR 3 sec, 50 HZ VIBRATIONS FOR 2 sec, 100 HZ VIBRATIONS FOR 3 sec |

TABLE 22

| RECEPTIVE LEVEL | PROBABILITY OF PRESENTATION |
|---|---|
| 5 | 5% |
| 4 | 25% |
| 3 | 50% |
| 2 | 75% |
| 1 | 95% |

The invention claimed is:

1. A vehicle driving assist apparatus comprising:
an input section configured to sense a vehicle traveling condition of a vehicle;
an output section configured to present assist information to a driver of the vehicle; and
a control section configured to prepare the assist information in accordance with the vehicle traveling condition, the control section being further configured to determine an estimation quantity representing a receptivity of the driver to receive the assist information presented to the driver, and to adjust the assist information in accordance with the estimation quantity of the driver;
wherein the control section is configured to determine an index parameter indicative of a driver's reaction to the assist information from the vehicle traveling condition, and to calculate the estimation quantity from at least one of values of the index parameter.

2. The vehicle driving assist apparatus as claimed in claim 1, wherein the control section is configured to calculate the receptivity of the driver as the estimating quantity, in accordance with the vehicle traveling condition, and to adjust the assist information in accordance with the receptivity of the driver.

3. The vehicle driving assist apparatus as claimed in claim 1, wherein the control section is configured to calculate a responsiveness of the driver to the assist information, in accordance with the vehicle traveling condition, and to calculate the estimation quantity from the responsiveness.

4. The vehicle driving assist apparatus as claimed in claim 1, wherein the control section is configured to determine a driving behavior of the driver from the vehicle traveling condition, and to determine the estimation quantity of the driver from a variation of the driving behavior.

5. The vehicle driving assist apparatus as claimed in claim 1, wherein the control section is configured to calculate the estimation quantity of the driver, from a difference between an after tendency typifying a collection of values of the index parameter collected after presentation of the assist information to the driver, and a reference tendency.

6. The vehicle driving assist apparatus as claimed in claim 1, wherein the control section is configured to examine whether a predetermined condition of a predetermined scene is satisfied, to determine a value of a behavior index, as the index parameter, from the vehicle traveling condition when the predetermined condition of the predetermined scene is satisfied, and to calculate the estimation quantity, from the value of the behavior index.

7. The vehicle driving assist apparatus as claimed in claim 1, wherein the control section is configured to determine a long term tendency typifying a collection of values of the index parameter collected during a longer period and a short term tendency typifying a collection of values of the index parameter collected during a shorter period, to calculate a stability indicator from a difference between the long term tendency and the short term tendency, and to produce a message to present the assist information in accordance with the stability indicator.

8. The vehicle driving assist apparatus as claimed in claim 1 wherein the control section is configured to determine a stability of the vehicle, and to produce a message to present the assist information in accordance with the stability.

9. The vehicle driving assist apparatus as claimed in claim 1, wherein the control section is configured to determine a presentation mode to present the assist information to the driver, in accordance with the estimation quantity of the driver, and to present the assist information through the output section to the driver in the presentation mode.

10. The vehicle driving assist apparatus as claimed in claim 9, wherein the control section is configured to determine the presentation mode of the assist information, by determining a presentation form which includes at least one of a visual form, an audible form and a tactile form, in accordance with the estimation quantity of the driver.

11. The vehicle driving assist apparatus as claimed in claim 9, wherein the control section is configured to determine the presentation mode of the assist information, by determining at least one of expression of presentation of the assist information, degree of stimulation in presentation of the assist information, and a frequency of presentation of the assist information, in accordance with the estimation quantity of the driver.

12. A vehicle driving assist apparatus comprising:
an input section configured to sense a vehicle traveling condition of a vehicle;
an output section configured to present assist information to a driver of the vehicle; and
a control section configured to prepare the assist information in accordance with the vehicle traveling condition, the control section being further configured to determine an estimation quantity representing a receptivity of the driver to receive the assist information presented to the driver, and to adjust the assist information in accordance with the estimation quantity of the driver;
wherein the control section is configured to determine a driving behavior of the driver from the vehicle traveling condition, and to determine the estimation quantity of the driver from a variation of the driving behavior; and
wherein the control section is configured to set the estimation quantity to a most recently determined value when the most recently determined value of the estimation quantity is available, and to set the estimation quantity to a predetermined initial value when the most recently determined value is not available, and wherein the control section is configured to update the estimation quantity in accordance with the driving behavior.

13. The vehicle driving assist apparatus as claimed in claim 12, wherein the control section is configured to determine the estimation quantity which is a discrete quantity assuming one of a plurality of levels.

14. A vehicle driving assist method comprising:
an input operation of ascertaining a vehicle traveling condition of a vehicle;
an output operation of presenting assist information to a driver of the vehicle; and
a control operation of preparing the assist information in accordance with the vehicle traveling condition, determining an estimation quantity representing a receptivity of the driver to receive the assist information presented to the driver, and adjusting the assist information presented to the driver, in accordance with the estimation quantity of the driver;
wherein the control operation includes an operation of determining an index parameter indicative of a driver's reaction to the assist information from the vehicle traveling condition, and an operation of calculating the estimation quantity from at least one of values of the index parameter.

15. A vehicle driving assist apparatus comprising:
an input section configured to sense a vehicle traveling condition of a vehicle;
an output section configured to present assist information to a driver of the vehicle; and
a control section configured to prepare the assist information in accordance with the vehicle traveling condition, the control section being further configured to determine an estimation quantity representing a receptivity of the driver to receive the assist information presented to the driver, and to adjust the assist information in accordance with the estimation quantity of the driver;
wherein the control section is configured to calculate a clarity index of the assist information in accordance with the receptivity of the driver, to set the clarity index of the assist information lower as the receptivity of the driver is higher, and to set the assist information in accordance with the clarity index, and the control section is configured to increase clarity of the assist information for promoting a stability by using a visual graphic form of histogram when the clarity index becomes higher.

16. The vehicle driving assist apparatus as claimed in claim 15, wherein the control section is configured to present the assist information for promoting the stability with the output section by using the visual graphic form including a histogram representing a current driving behavior of the driver together with a histogram representing a past driving behavior of the driver when the clarity index becomes higher.

17. A vehicle driving assist apparatus comprising:
an input section configured to sense a vehicle traveling condition of a vehicle;
an output section configured to present assist information to a driver of the vehicle; and
a control section configured to prepare the assist information in accordance with the vehicle traveling condition, the control section being further configured to periodically calculate an index parameter indicative of a driving behavior of the driver, from the vehicle traveling condition, to determine a long term tendency typifying a collection of values of the index parameter collected during a longer period and a short term tendency typifying a collection of values of the index parameter collected during a most recent shorter period shorter than the longer period, to calculate a stability indicator from a difference between the long term tendency and the short term tendency, and to produce an assist message to present the assist information in accordance with the stability indicator.

18. The vehicle driving assist apparatus as claimed in claim 17, wherein the control section is configured to present the assist message in a visual form including a graph representing the short term tendency.

19. The vehicle driving assist apparatus as claimed in claim 17, wherein the index parameter indicative of the driving behavior of the driver includes a forward vehicle interval to a forward vehicle preceding the vehicle equipped with the vehicle driving assist apparatus.

20. The vehicle driving assist apparatus as claimed in claim 17, wherein the control section is configured to calculate an estimation quantity representing a receptivity of the driver to receive the assist information presented to the driver in accordance with values of the index parameter, and to produce the assist information in accordance with the stability indicator and the estimation quantity of the driver.

* * * * *